(12) United States Patent
Nakamichi

(10) Patent No.: US 6,301,205 B1
(45) Date of Patent: *Oct. 9, 2001

(54) CHANGER-TYPE DISK PLAYBACK DEVICE

(75) Inventor: Niro Nakamichi, Tokyo (JP)

(73) Assignee: Nakamichi Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,122

(22) Filed: Aug. 28, 1997

(30) Foreign Application Priority Data

Sep. 26, 1996 (JP) ................................................ 8-277160

(51) Int. Cl.[7] ............................. G11B 17/22; G11B 17/04
(52) U.S. Cl. ............................. 369/36; 369/178; 369/192
(58) Field of Search ........................... 369/36, 38, 75.2, 369/192, 178, 77.1, 75.1, 77.2

(56) References Cited

U.S. PATENT DOCUMENTS

| | | | |
|---|---|---|---|
| 5,117,409 | * 5/1992 | Shimizu et al. | 369/36 |
| 5,216,645 | * 6/1993 | Sakayama | 369/36 |
| 5,561,657 | * 10/1996 | Ogawa | 369/179 |
| 5,808,976 | * 9/1998 | Hisatomi | 369/36 |

\* cited by examiner

*Primary Examiner*—David Davis
*Assistant Examiner*—Tod Kupstas
(74) *Attorney, Agent, or Firm*—Morrison Law Firm

(57) ABSTRACT

A disk playback device provides a space above and below a selected disk held in a disk holder. A turntable and optical pickup reside within the space. The turntable is moved inward in the space from a storage position to chuck, and withdraw, the selected disk from its disk holder to a playback position in which the axis of the turntable is within the outline of disks stored in disk holders. The storage position places the axis of the turntable outside the outline of disks stored in the disk holders. In a single play mode, a disk not stored in a disk holder is moved directly from outside the disk playback device to the playback position where it is chucked and played. On conclusion of single play, the disk is transported out of the disk playback device without being resident in a disk holder.

27 Claims, 29 Drawing Sheets

CHANGER-TYPE DISK PLAYBACK DEVICE

BACKGROUND OF THE INVENTION

The present invention relates to a changer-type disk playback device capable of selectively playing back a plurality of disks.

U.S. Pat. No. 5,138,591, Japanese Laid-open Publication Number 6-36436, and U.S. Pat. No. 5,561,657 disclose changer-type disk playback devices that allow a selected disk to be played back without requiring the disk to be pulled out from its storage position. In order to make the device compact, playback means, comprising an optical pickup, a turntable, and the like, is moved horizontally between a plurality of coaxially disposed disks.

These conventional examples comprise a magazine having a plurality of mounting plates. A disk is mounted on each of these mounting plates. The magazine can be attached and removed from the device. When this magazine is outside the device, a lock mechanism locks the mounting plates so that the mounting plates do not separate from each other. When the magazine is stored in the device, the lock mechanism is released by a prescribed lock releasing mechanism in the device. During disk playback, the mounting plates are moved in a direction perpendicular to the disk surfaces, thereby providing more space. Playback mechanisms positioned at recessed positions, such as a turntable and an optical pickup, are moved in the space created by moving the mounting plates to allow disks to be played back without requiring the disks to be pulled out from the magazine.

When disks not held in the magazine are to be played back, the magazine is removed from the device, and disks are removed from the magazine. Then, the disk to be played back is mounted in the magazine, and the magazine is remounted in the device. This makes operating the device complex. Thus, there is a need for this type of changer-type disk playback device to be equipped with a loading mechanism for loading a disk inserted from a slit formed on a front panel of the device into the device. The loading mechanism can be either a pinch-roller loading mechanism where the disk surface is interposed between a drive roller and a driven roller, or a belt loading mechanism where the edges of the disk are supported by a continuous drive belt disposed along a disk transfer path.

When a disk is to be stored in a storing position using a loading mechanism, a supporting means must be disposed to support the disk at the storing position. The supporting means can take on a variety of different structures. When the recording surface or label surface of disks are mounted on a mounting plate, as in the conventional technology described above, the disk can be damaged by the sliding contact between the disk surface and the mounting surface during the loading operation. In Japanese Laid-open Publication Number 9-17171, filed by the present applicant, an arcuate disk holder that supports the disk edge over approximately 180 degrees can be used. According to this disk supporting means, the sliding contact between the disk and the disk holder takes place only at the edge, where no data is recorded. Thus, even if the disk is scratched, there is no effect on playback.

During disk playback, the disk must be moved away from the disk holder so that the disk holder and the disk are out of contact with each other. If the disk holder is disposed close to the front panel of the device, the disk would project from the front panel when the disk is pulled out. Thus, the disk holder needs to be disposed further back in the device so that there is space between the front panel and the disk holder for the disk to be pulled out.

OBJECTS AND SUMMARY OF THE INVENTION

It is therefore an object of the invention to provide a playback device which overcomes the drawbacks of the prior art.

It is a further object of the invention to provide a playback device which permits playing of a disk while an axis of the disk remains within a perimeter of stored disks.

It is a still further object of the invention to provide a disk playback device in which a spacing between disks is sufficient to permit a turntable to move to and chuck a disk stored in a disk storage device, then withdraw the disk to a playback position.

It is a still further object of the invention to provide a disk playback device in which a storage position for a turntable and optical pickup is located outside a vertical space about a disk playback position.

Briefly stated, the present invention provides a disk playback device in which a space above and below a selected disk held in a disk holder provides room for a turntable and optical pickup to move in and out of positions outside and inside the perimeter of stored disks. The turntable is moved inward in the space from a storage position to chuck, and withdraw, the selected disk from its disk holder to a playback position in which the axis of the turntable is within the outline of disks stored in disk holders. The storage position places the axis of the turntable outside the outline of disks stored in the disk holders. In a single play mode, a disk not stored in a disk holder is moved directly from outside the disk playback device to the playback position where it is chucked and played. On conclusion of single play, the disk is transported out of the disk playback device without being resident in a disk holder.

When the disk holder is moved perpendicular to the disk surface in order to play back a disk, playback means needs to be recessed to a position where there is no overlapping with the disk. The space that is needed to provide a recessed position for the playback means acts as a bottleneck in making the device more compact.

In order to achieve the object described above, a changer-type disk playback device according to the present invention comprises: a plurality of disk supporting members supporting a plurality of disks so that the disks are coaxial; disk support member transferring means transferring the plurality of disk supporting members in a direction perpendicular to the surface of the disks; disk transferring means transferring a disk between a selected disk supporting member and a disk insertion/removal position; playback means performing playback of a disk comprising at least an optical pickup and a turntable; disk withdrawing means pulling out a disk from a disk supporting member so that the disk and the disk supporting member are out of contact; and a playback means transferring mechanism moving the playback means to a recessed position and a playback position. The recessed position is a position in a flat region formed by the transfer of the disk by the disk transferring means where the turntable does not overlap with the disks held in the plurality of disk support members. The playback position is a position where the turntable overlaps with the disks held in the plurality of the disk support members.

When the playback means is at the recessed position, it is positioned between the disk insertion/removal position, which is provided by disk transferring means, and disk supporting means. Thus, there is no need to prepare a space exclusively for the recessed position of playback means.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

The following is a description of the embodiments according to the present invention of a changer-type disk playback device capable of holding five disks.

Figure 1:
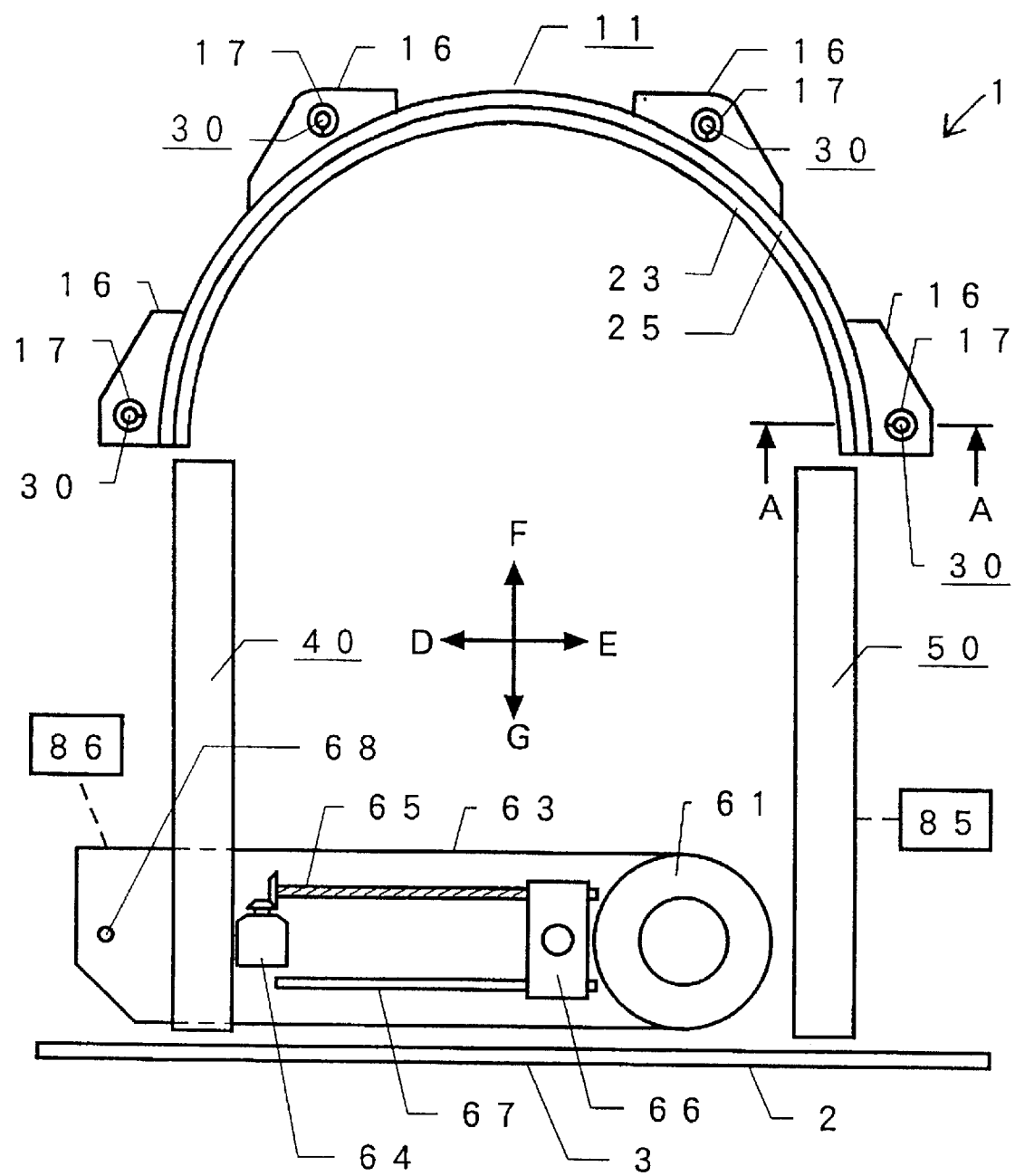
FIG. 1 is a schematic plan view to which reference will be made in describing the operations of the disk playback device over time.
Figure 21:
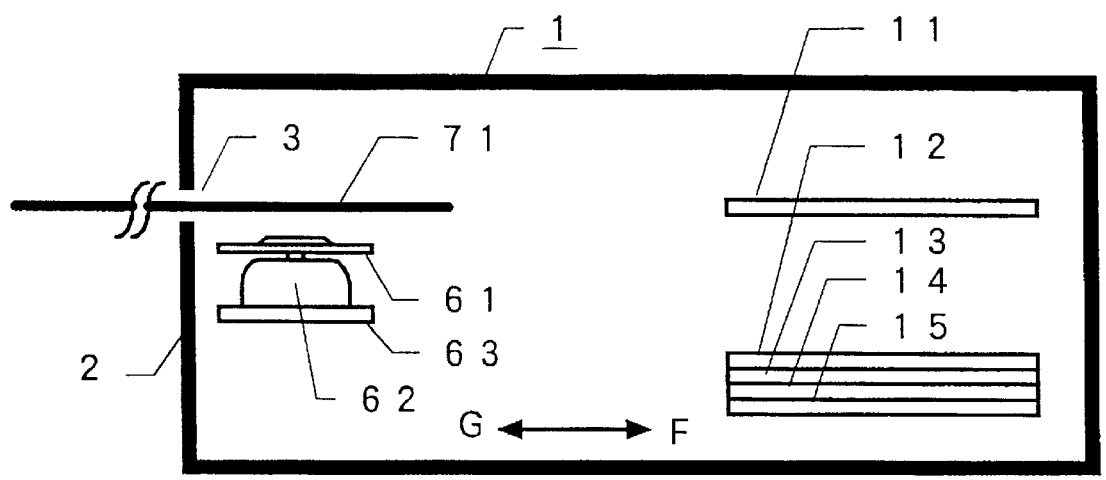
FIG. 21 is a schematic side-view drawing for the purpose of describing the operations of the disk playback device over time.

Referring to FIG. 1, there is shown a disk playback device 1, having a five disk capacity, in which disks are absent. Arcuate disk holders 11–15 (only upper disk holder 11 is seen in FIG. 1, the relative positions of the five arcuate disk holders 11–15 are shown in FIG. 21), for holding up to five disks, are disposed to support the edges of disks along an angular range of approximately 180 degrees. All of disk holders 11–15 are identical, therefore only first disk holder 11, at the uppermost position is described in detail.

Figure 35:
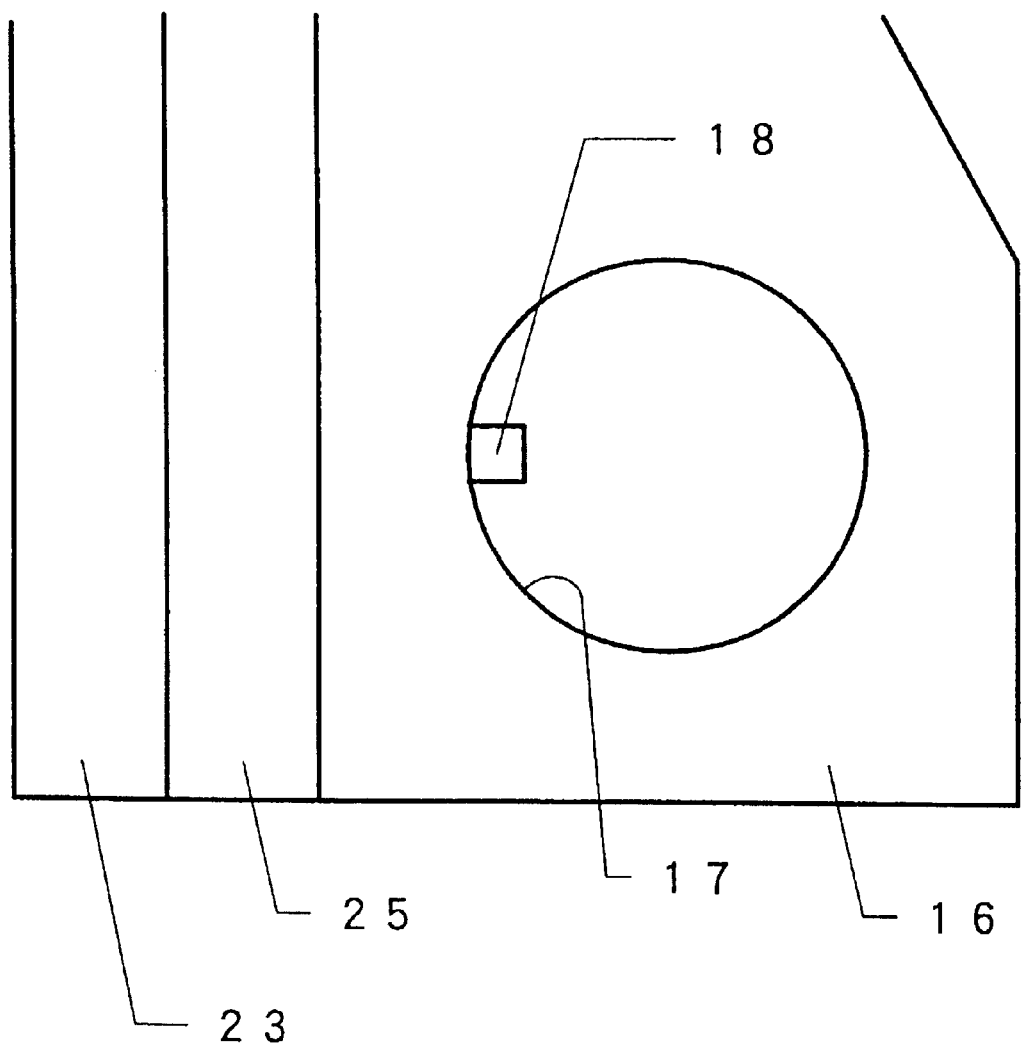
FIG. 35 is an enlarged drawing of flange 16.

Four flanges 16 are disposed on disk holder 11. A round hole 17 is formed on each flange 16. Referring momentarily also to the enlarged drawing in FIG. 35, an engagement pin 18 projects into round hole 17.

Figure 7:
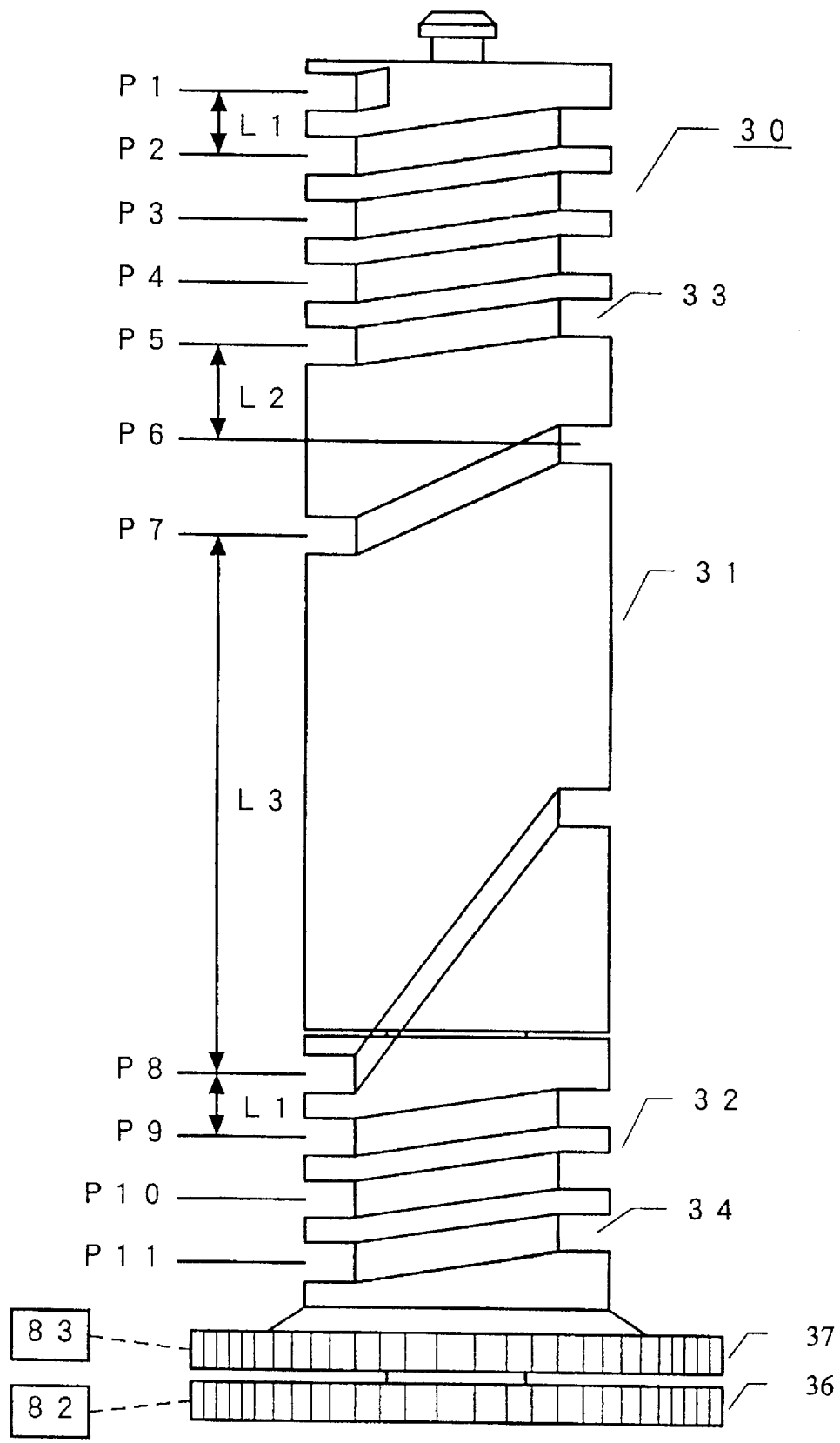
FIG. 7 is a side-view drawing of the cam means.

Returning now to FIG. 1, together with FIG. 7, each round hole 17 fits over a disk holder transferring means 30. Each disk holder transferring means 30 includes a cylindrical part having interconnected cam grooves 33–34 in its surface. Engagement pin 18 fits into cam grooves 33, 34. Disk holder transferring means 30, which is described later, transfers disk holders 11–15 in a direction perpendicular to the paper surface of FIG. 1.

Figure 8:
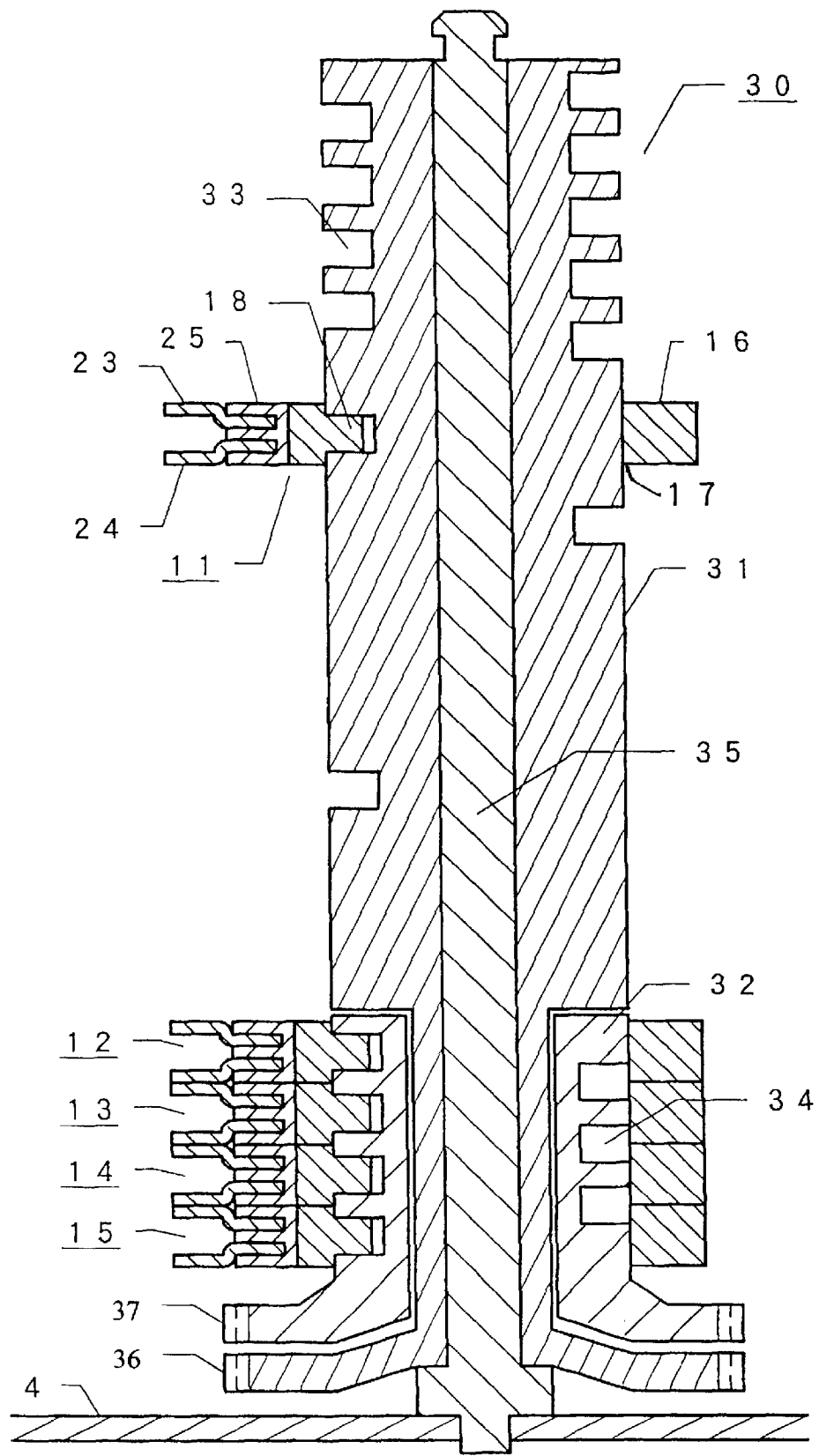
FIG. 8 is a cross-section drawing along the A—A line in FIG. 1 for the purpose of describing the operations of the cam means over time.

Referring now to FIG. 8, a cross-section drawing along the line A—A line in FIG. 1 shows the relationship between disk holders 11–15 and disk holder transferring means 30. Disk holder 11 (as well as the remainder of the disk holders) includes disk supports 23, 24 for supporting the edges of the label side and the recording side of a disk. A base 25 is attached integrally with disk supports 23, 24. A flange 16, attached to base 25, encircles the cylindrical portion of disk holder transferring means 30. Engagement pin 18 extends inward into round hole 17 to engage a cam groove 33 in a first cylindrical cam 31.

Disk holder transferring means 30 is a two-piece structure which includes first cylindrical cam 31 and a second cylindrical cam 32 having identical outer diameters. Second cylindrical cam 32 is free to rotate relative to first cylindrical cam 31. First cylindrical cam 31 is free to rotate on a pin 35 extending upward from a chassis 4. Cam groove 33 is formed on the outer perimeter of first cylindrical cam 31. A second cam groove 32 is formed on second cylindrical cam 32. Engagement pin 18 of upper disk holder 11 rides in cam groove 33. Engagement pins 18 of disk holders 12–15 ride in cam grooves 34 and 33, as will be explained. Disk holder transferring means 30, comprising first and second cylindrical cams 31, 32, move disk holders 11–15 in the vertical directions.

Referring to FIGS. 7 and 8, cam grooves 33, 34 have an irregular pitch. Positions P1–P11 indicate positions to which engagement pins 18, and the disk carried in their related disk holders, are moved by rotation of disk holder transferring means 30. A pitch LI separates positions P1–P5. A pitch L2, larger than pitch L1, separates positions P5–P7. A pitch L3, larger than pitch L2, separates positions P7–P8. Pitch L1 is also duplicated to separate positions P8–P11. First cylindrical cam 31 and second cylindrical cam 32 are positioned at rotational positions in which the connecting positions between cam grooves 32 and 33 aligned. Pitch L1 is set so that adjacent disk holders are in close contact without a separating space. This enhances compactness of the apparatus.

A spur wheel 36 is disposed on first cylindrical cam 31. A second spur wheel 37 is disposed on second cylindrical cam 32. Spur wheels 36, 37 are connected to conventional cylindrical cam driving mechanisms 83, 82, which may be, for example, a motor or the like. Spur wheels 36, 37 control the rotational direction and position of first cylindrical cam 31 and second cylindrical cam 32. Disk holder transferring means 30 are disposed on each of the four flanges 16. Spur wheels 36, 37 are connected to each disk holder transferring means 30 so that all four disk holder transferring means 30 are driven by cylindrical cam drive mechanisms 82, 83 in the same direction and the same rotation angle. Rotation of disk transferring means 30 moves disk holders 11–15 vertically within disk playback device 1 while maintaining them parallel to each other.

Figure 36:
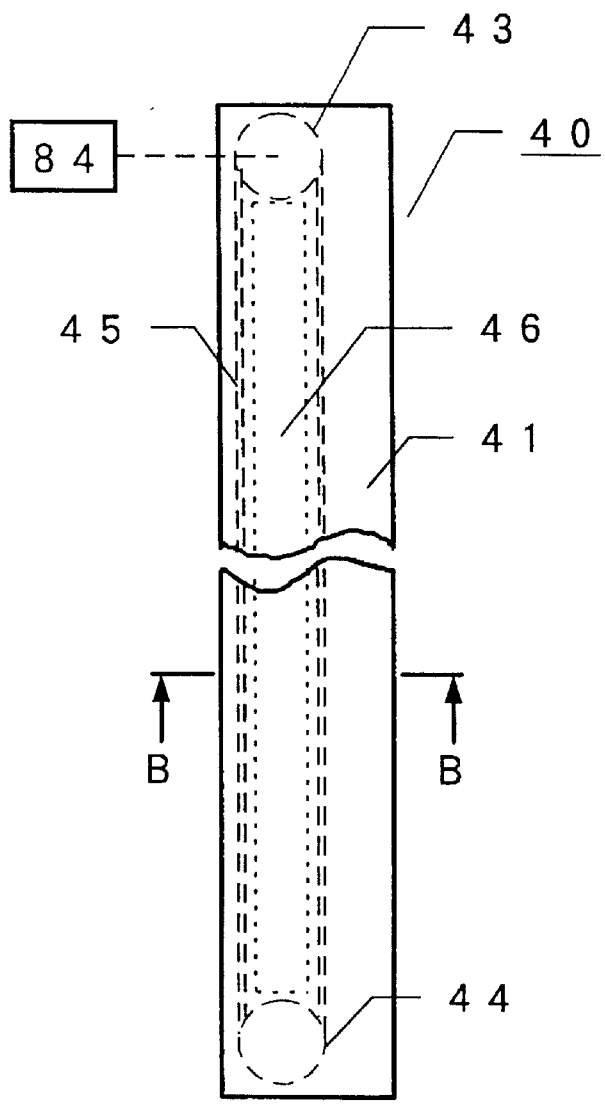
FIG. 36 is a top-view drawing of belt drive mechanism 40.
Figure 37:
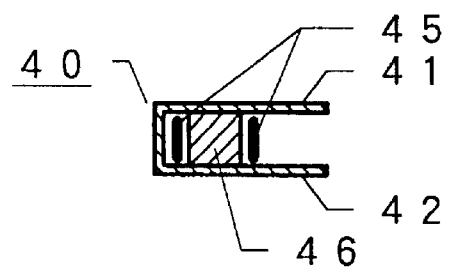
FIG. 37 is a cross-section drawing along the B—B line of FIG. 36.

Referring also to FIG. 1, a disk inserted through a slit 3 in front panel 2 of device 1 is transferred to disk holders 11–15 by a disk transferring means. The disk transferring means is preferably a belt drive mechanism 40 on the left side and a guide mechanism 50 on the right side. Referring to FIG. 36, which shows a topview drawing of belt drive mechanism 40, and FIG. 37, which shows a crosssection drawing along the B—B line in FIG. 36, a pair of upper and lower guide plates 41, 42 support the edge of a disk from above and from below. A continuous drive belt 45 is disposed between guide plates 41, 42. Drive belt 45 passes over a driven pulley 43 and an idler pulley 44. Driven pulley 43 is driven in a conventional manner by a conventional pulley drive mechanism 84 such as, for example, a motor or the like. A fixing block 46 is disposed within the loop of drive belt 45 to support drive belt 45 against inward flexing.

Figure 38:
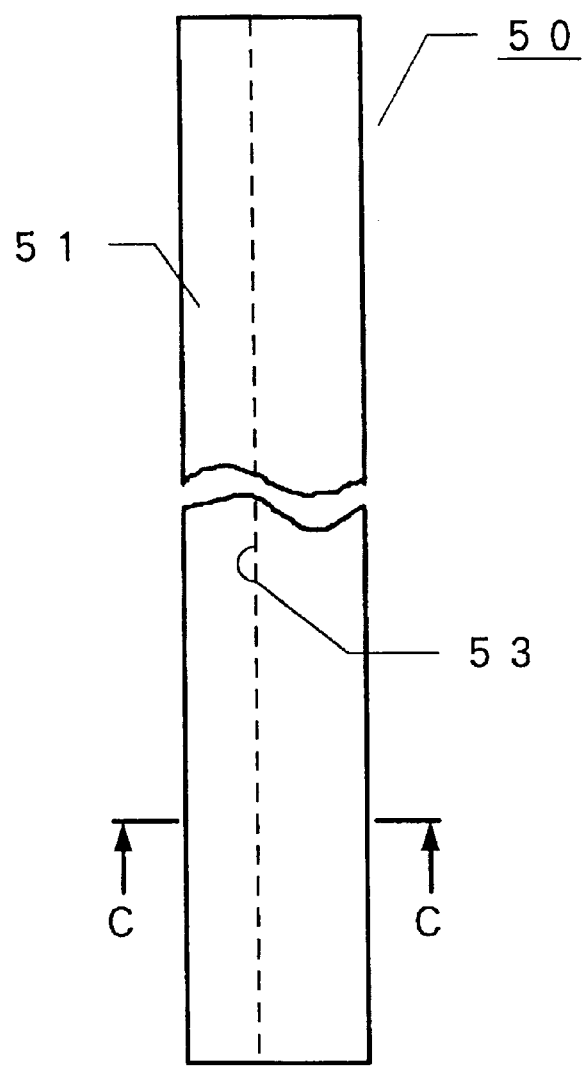
FIG. 38 is a top-view drawing of guide mechanism 50.
Figure 39:
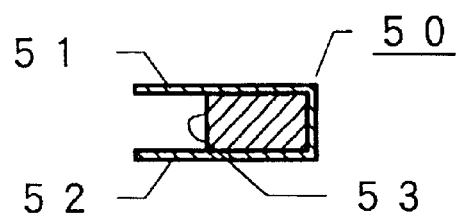
FIG. 39 is a cross-section drawing along the C—C line in FIG. 38.

Referring to FIGS. 38 and 39, guide mechanism 50 includes an upper guide plate 51 and a lower guide plate 52 supporting the edge of a disk. A guide wall 53 between upper and lower guide plates 51 and 52 contacts the disk edge. A connecting mechanism (not shown in the drawings) allows belt drive mechanism 40 and guide mechanism 50 to move in the direction of arrows D and E in FIG. 1. Guide mechanism 50 and belt drive mechanism 40 are connected so that when guide mechanism 50 is moved a transverse distance in the direction of arrow E, drive mechanism 40 is moved the same distance in the opposite direction, in the direction of arrow D. Thus, a center position, equally spaced between guide mechanism 50 and belt drive mechanism 40 remains in the same transverse location, during inward and outward movement of these two elements. A belt/guide driving mechanism 85 includes a motor or the like to move belt drive mechanism 40 and guide mechanism 50 in the D–E direction.

With a disk supported between drive belt 45 and guide wall 53, drive pulley 43 is rotated counter-clockwise by pulley drive mechanism 84. This rotates the disk clockwise while transferring it in the direction indicated by an arrow F, which is perpendicular to the D–E direction. This transfers the disk, after insertion through slit 3 in front panel 2, into a storage position in the selected disk holder in device 1. Also, when drive pulley 43 is rotated clockwise by pulley drive mechanism 84, the disk is rotated counter-clockwise to transfer it in the direction of an arrow G, which is in the opposite direction from arrow F. This moves the selected disk out from the disk holder to a position where a section of the disk projects from slit 3, where it can be grasped by a user.

Referring to FIGS. 1 and 21, a spindle motor 62 (not shown in FIG. 1), which rotates a turntable 61 for mounting disks, is fixed to a chassis 63. Turntable 61 is known as a self-chucking turntable that does not require a damper for clamping the disk to turntable 61. A feed screw 65 is rotated by a thread motor 64 disposed on chassis 63. The rotation of feed screw 65 causes an optical pickup to be moved between an inner perimeter and an outer perimeter of a disk. A playback means includes at least turntable 61 and optical pickup 66 to perform the known operation of beaming a laser from optical pickup 66 to a disk while rotating it using turntable 61, and then reading the reflected light to playback data recorded on the disk.

A guide rail 67 is disposed to guide optical pickup 66 to move parallel to chassis 63. A shaft 68 is disposed at one end of chassis 63. Chassis 63 can rotate 45 degrees counter-clockwise from the stowage position shown in FIG. 1 around shaft 68. From this rotated position, chassis 63 can move straight in the direction of arrow F. The motion of chassis 63 is controlled by a chassis driving mechanism 86 comprising a motor or the like. Thus, shaft 68 and chassis driving mechanism 86 serve as the playback means transferring mechanism, which transfers playback means as described above.

Figure 3:
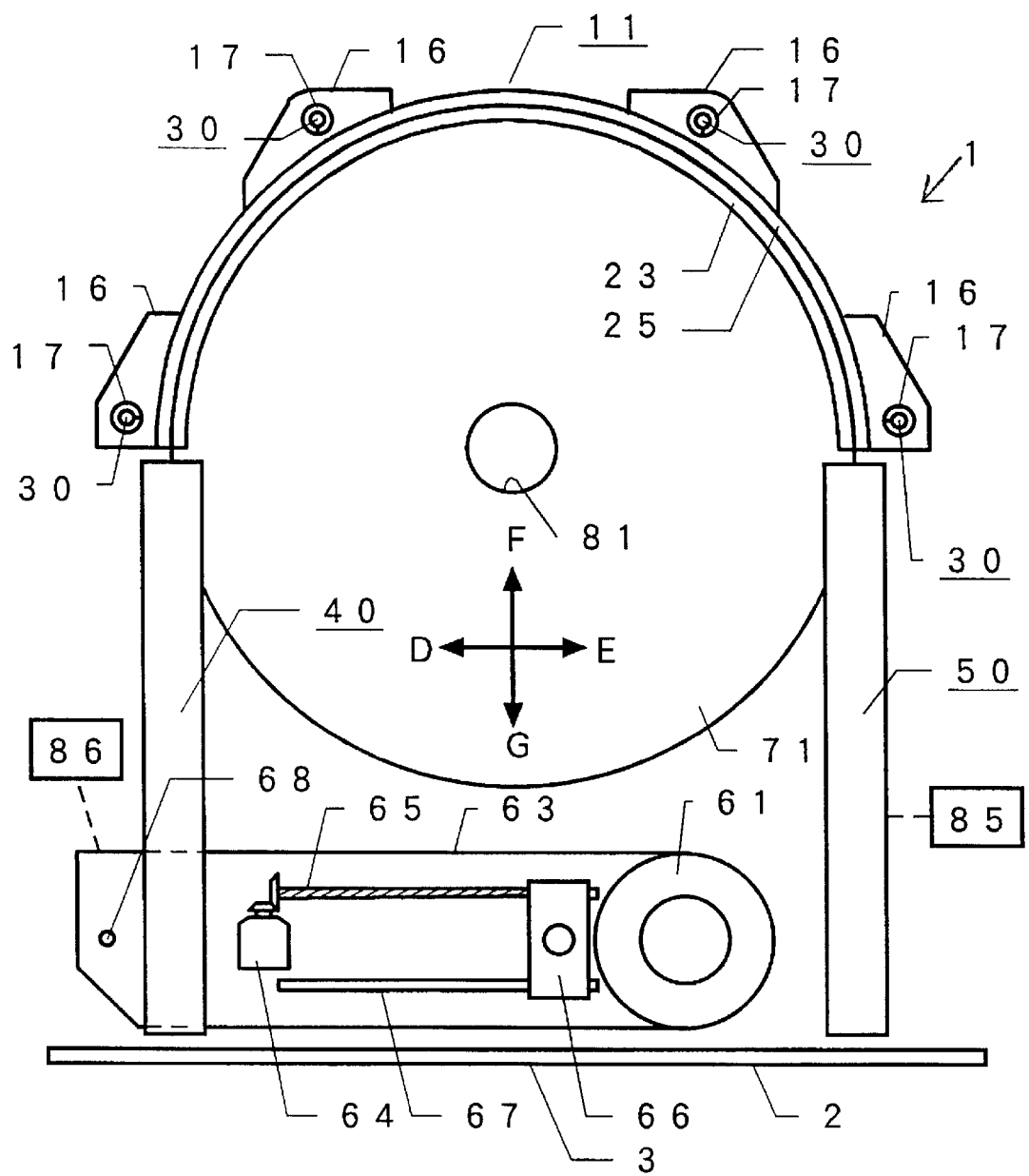
FIG. 3 is a schematic plan drawing for the purpose of describing the operations of the disk playback device over time.

Turntable 61 is positioned between front panel 2 and disk holders 11–15. Referring to FIG. 3, when a disk 71 is supported by disk holder 11, turntable 61 does not overlap disk 71. Instead, it is positioned in the loading path of disk 71 between front panel 2 and disk 71.

Figure 40:
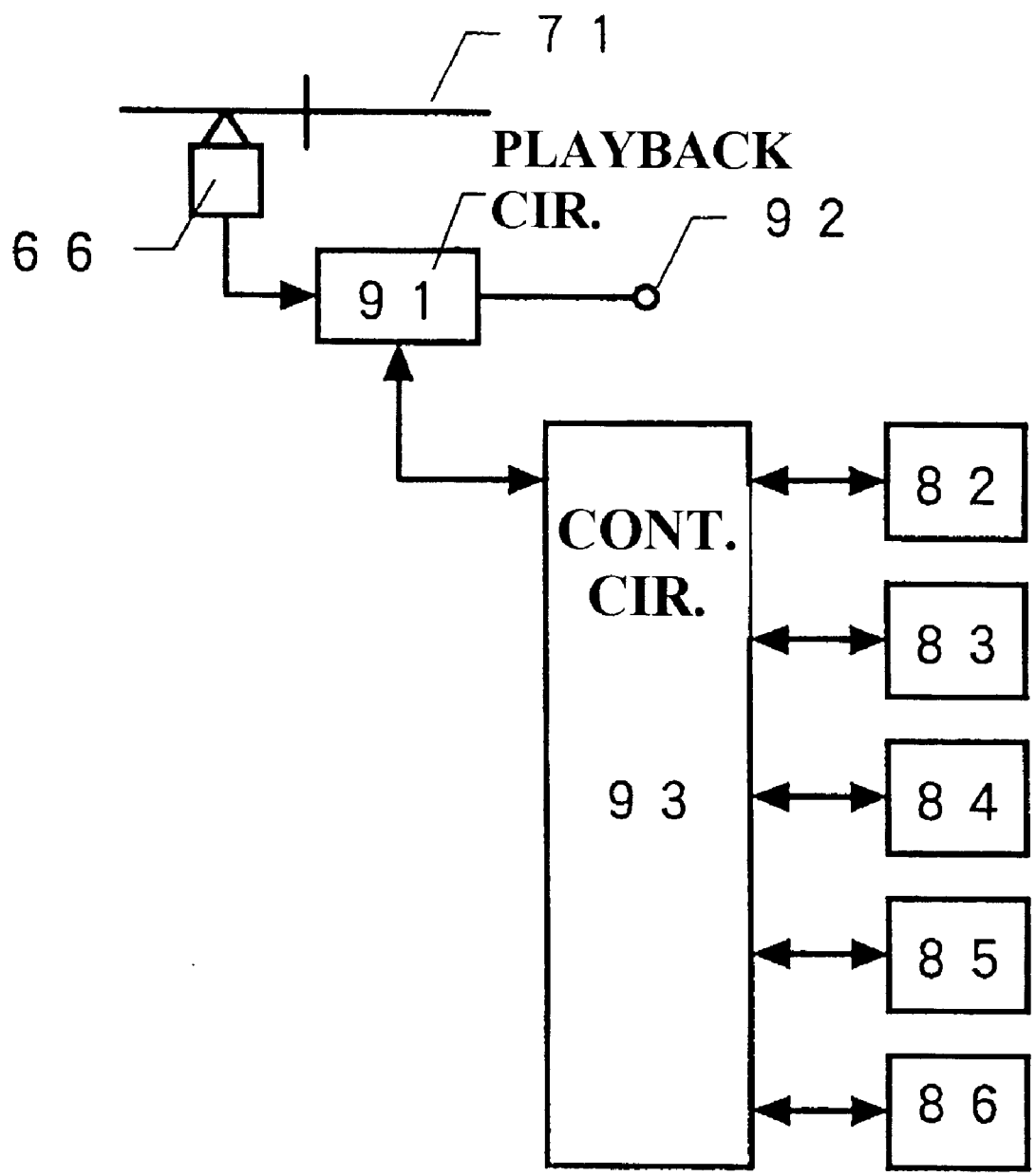
FIG. 40 is a block diagram of the control circuit of the disk playback device.

Referring now to FIG. 40, there is shown a block diagram for the circuit in device 1. Processing of data from disk 71 is performed by a conventional playback circuit 91 on the data read by optical pickup 66. The results are then output from an output terminal 92. A control circuit 93, comprising a microprocessor or the like, controls playback circuit 91 and controls cylindrical cam drive mechanisms 82, 83, pulley drive mechanism 84, belt/guide drive mechanism 85, and chassis drive mechanism 86 according to the timings described below.

Referring to the following drawings, the operations of this embodiment will be described below, with reference to FIG. 1 through FIG. 6, which show schematic plan views of device 1; FIG. 7, which shows a side-view of disk holder transferring means 30, which controls the vertical transfer of disk holders 11–15, and which shows positions P1–P11 of disk holders 11–15; FIG. 8–FIG. 20, which show the rotation of disk holder transferring means 30; and FIG. 21–FIG. 34, which show side-views of device 1 and describe the motion of the disk and disk holders 11–15 within device 1.

Referring to FIG. 1, in the initial state for storage of disks, drive belt 45 of belt drive mechanism 40 and guide wall 53 of guide mechanism 50 are moved to positions where their separation is smaller than the diameter of the disk. Referring to FIGS. 7 and 8, in the initial state, engagement pin 18, on flange 16 of first disk holder 11 is positioned at position P6 at cam groove 33 of first cylindrical cam 31. This positions first disk holder 11 at the same height as slit 3 in front panel 2. Engagement pins 18, on flanges 16 of second—fifth disk holders 12–15 are positioned at positions P8–P11 at cam groove 34 of second cylindrical cam 32.

From this state, disk 71 is inserted into slit 3. The insertion force causes belt drive mechanism 40 to be moved in the direction of arrow D, and guide mechanism 50 to be moved in the direction of arrow E by the same amount, resulting in the state shown in FIG. 2 and FIG. 21. This motion triggers pulley drive mechanism 84 to turn belt drive mechanism 40 and drive pulley 43 counterclockwise, and turn drive belt 45 counter-clockwise. Disk 71, which is supported between drive belt 45 and guide wall 53, is rotated clockwise and transferred in the direction indicated by arrow F. Belt drive mechanism 40 and guide mechanism 50 are moved away from each other slightly, and disk 71 is moved fully into device 1.

Figure 9:
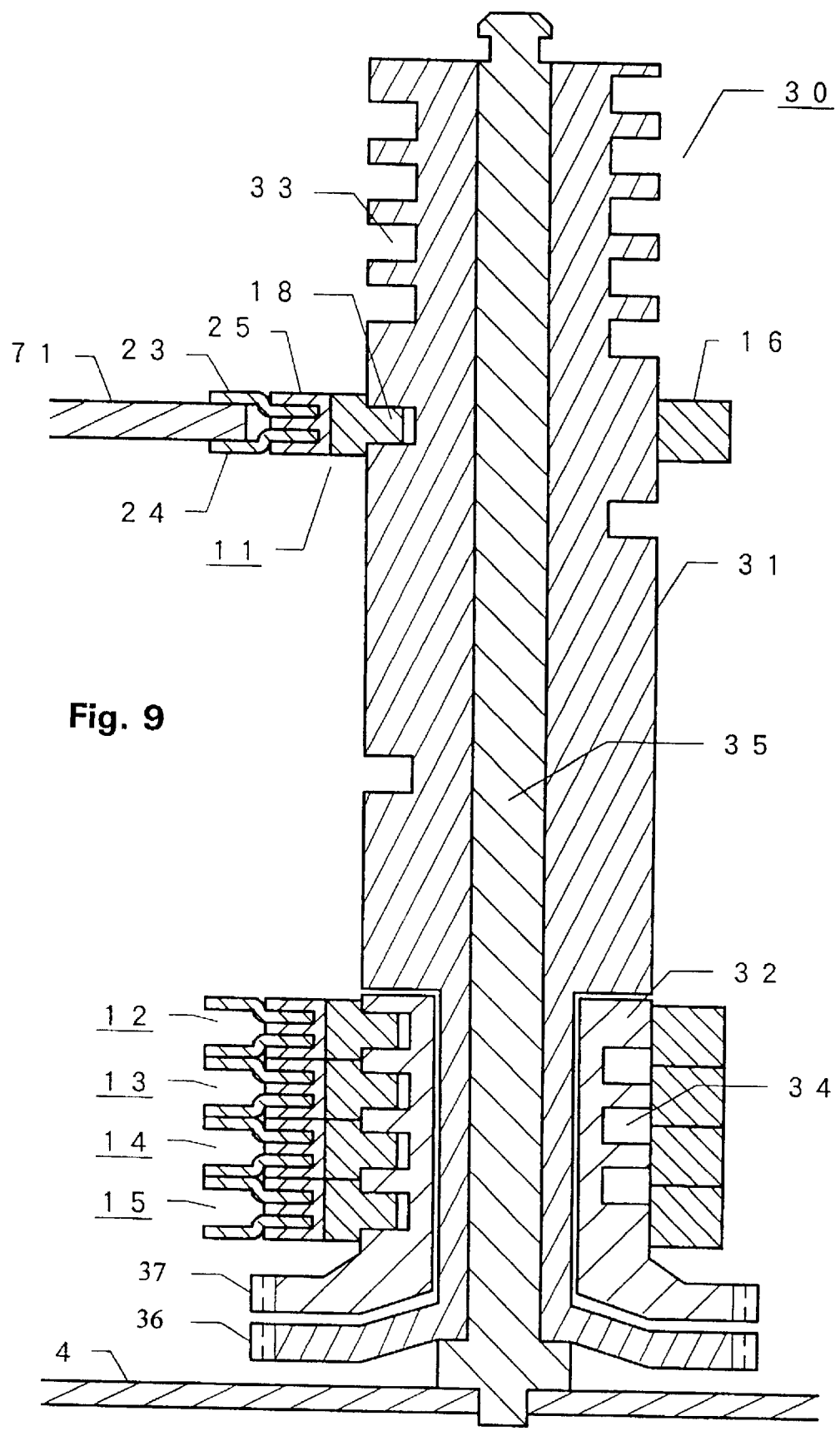
FIG. 9 is a cross-section drawing along the A—A line in FIG. 1 for the purpose of describing the operations of the cam means over time.
Figure 22:
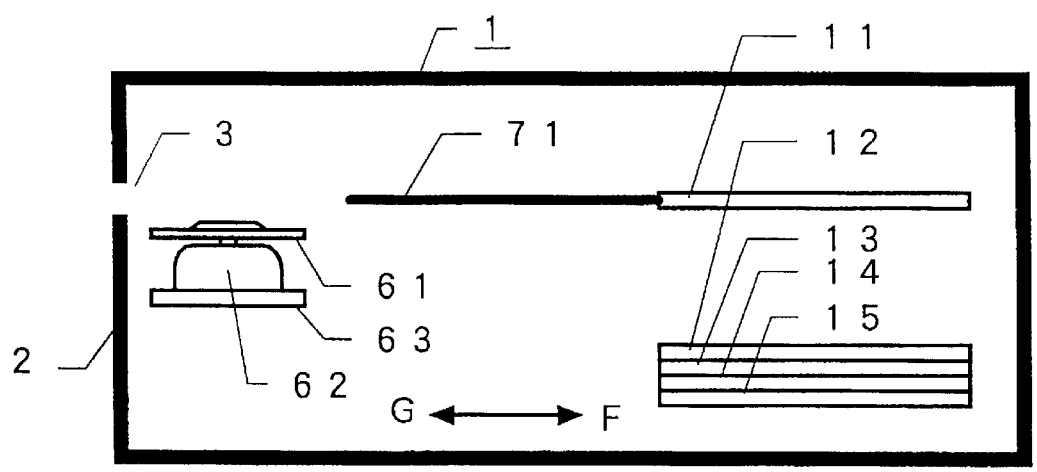
FIG. 22 is a schematic side-view drawing for the purpose of describing the operations of the disk playback device over time.

Referring to FIG. 3, FIG. 9, and FIG. 22, the rotation of drive belt 45 moves disk 71 into first disk holder 11. In this state, disk 71 is stably supported over approximately 180 degrees of its edge by disk supports 23, 24 of disk holder 11. To play back disk 71 after it has been loaded, the belt/guide drive mechanism first moves belt drive mechanism 40 in the direction of arrow D and guide mechanism 50 in the direction of arrow E. This moves belt drive mechanism 40 and guide mechanism 50 away from disk 71.

Figure 4:
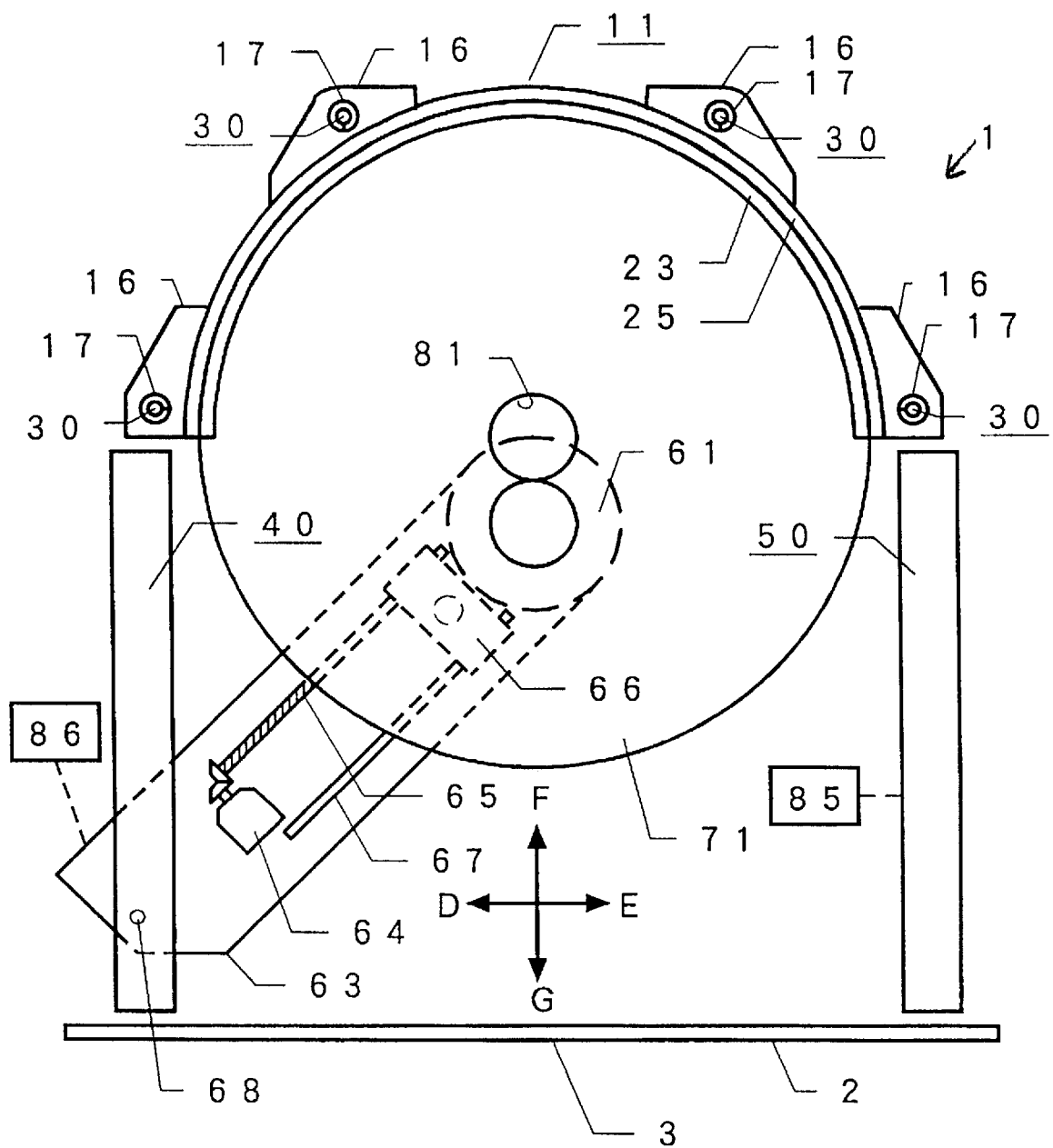
FIG. 4 is a schematic plan drawing for the purpose of describing the operations of the disk playback device over time.

Then, chassis 63 is rotated 45 degrees counter-clockwise around shaft 68 from the recessed position shown in FIG. 3 to the position shown in FIG. 4. Chassis 63 is then moved in the direction of arrow F. Chassis drive mechanism 86 transfers chassis 63 to a position shown in FIG. 5 and FIG. 23 so that the center of rotation of turntable 61 is aligned with the center of a center hole 81 in disk 71.

From this position, first cylindrical cam 31 is rotated 180 degrees counter clockwise by cylindrical cam drive mechanism 82 while second cylindrical cam 32 is kept stationary. This moves disk holder 11 from position P6 to position P7, descending by a distance of pitch L2.

Figure 10:
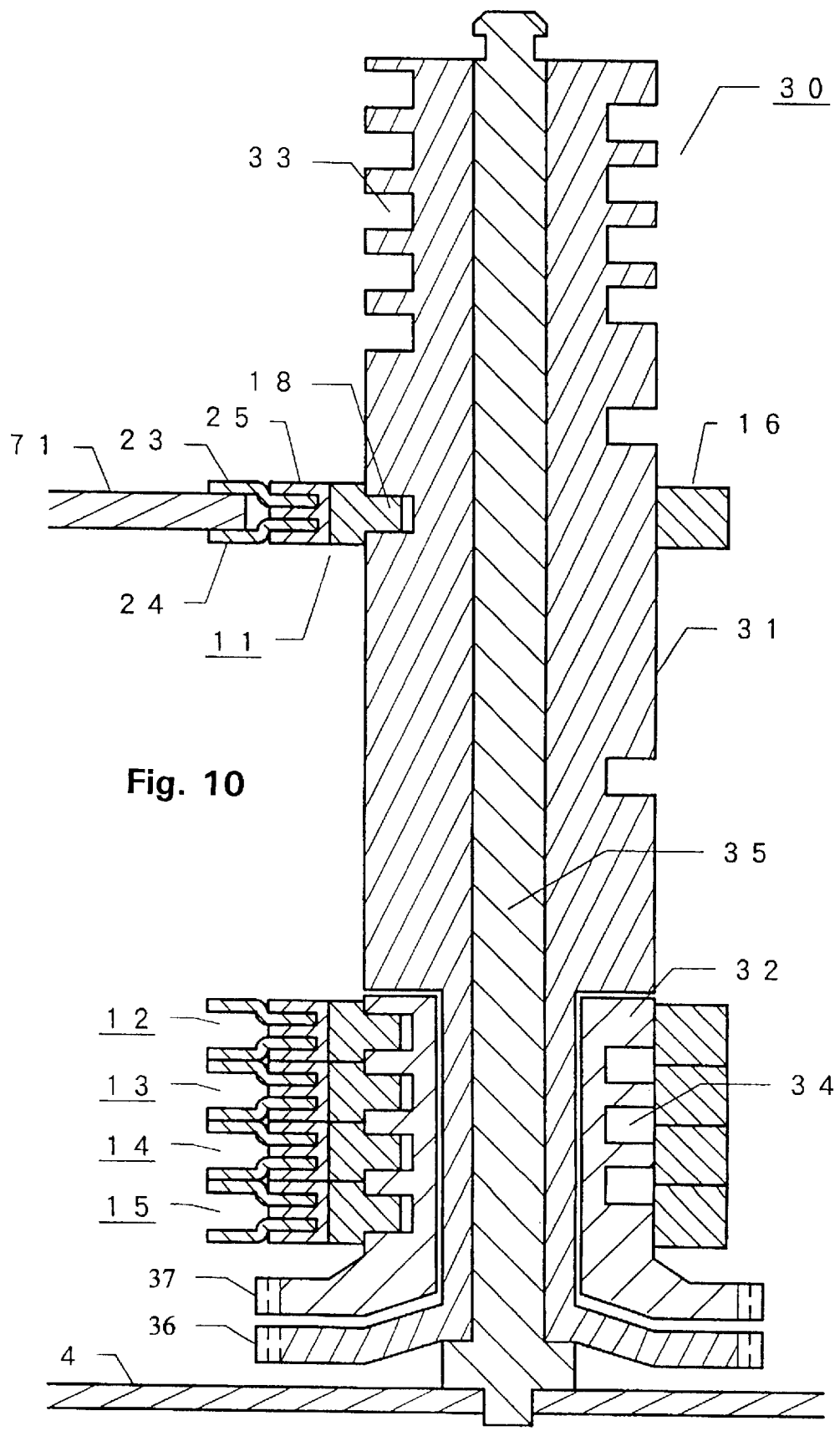
FIG. 10 is a cross-section drawing along the A—A line in FIG. 1 for the purpose of describing the operations of the cam means over time.
Figure 24:
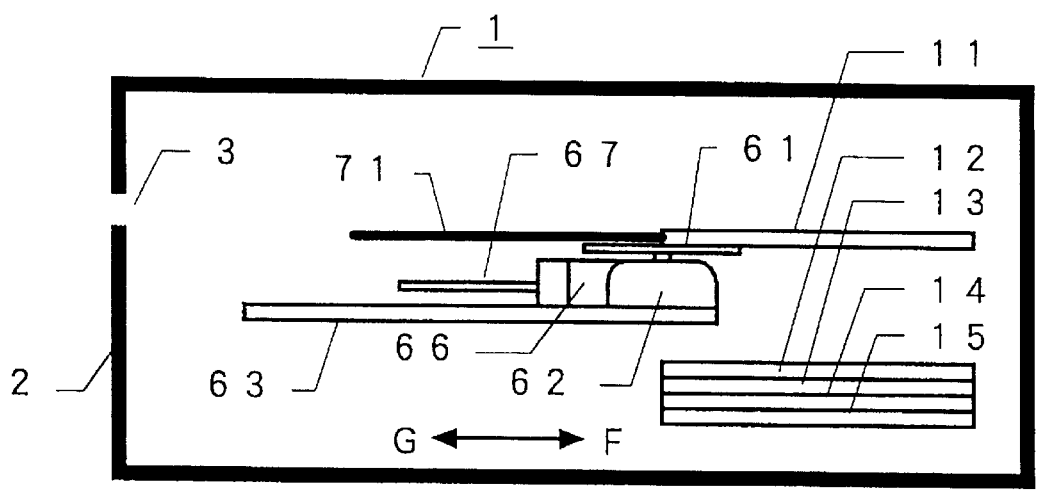
FIG. 24 is a schematic side-view drawing for the purpose of describing the operations of the disk playback device over time.

Referring to FIG. 10 and FIG. 24, disk 71 is mounted on turntable 61. A conventional self-chucking mechanism, not shown in the drawings, chucks disk 71 onto turntable 61. While disk holder 11 descends, the other disk holders 11–15 remain stationary, since they are positioned by second cylindrical cam 32, which remains stationary at this time.

Figure 5:
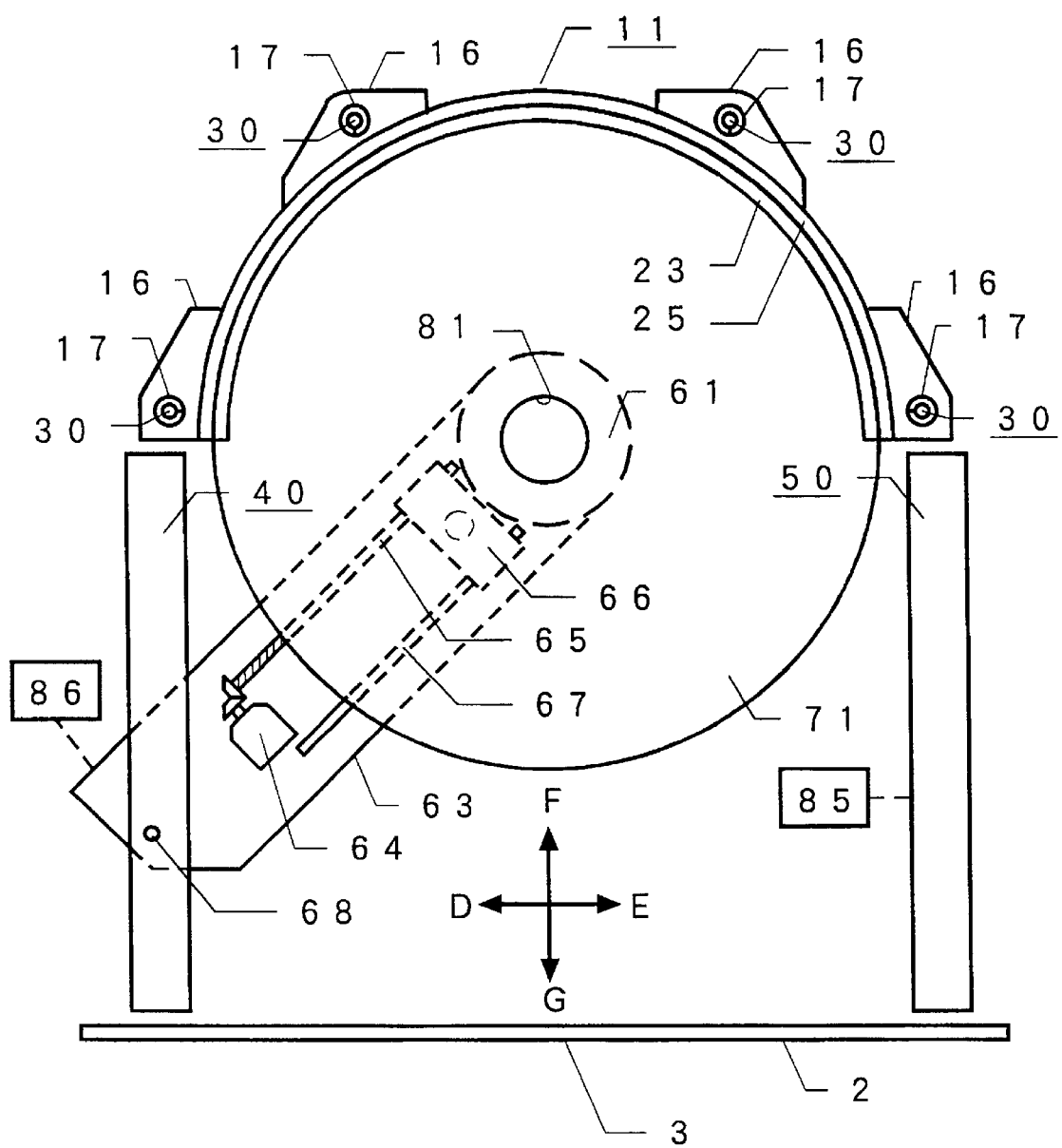
FIG. 5 is a schematic plan drawing for the purpose of describing the operations of the disk playback device over time.
Figure 6:
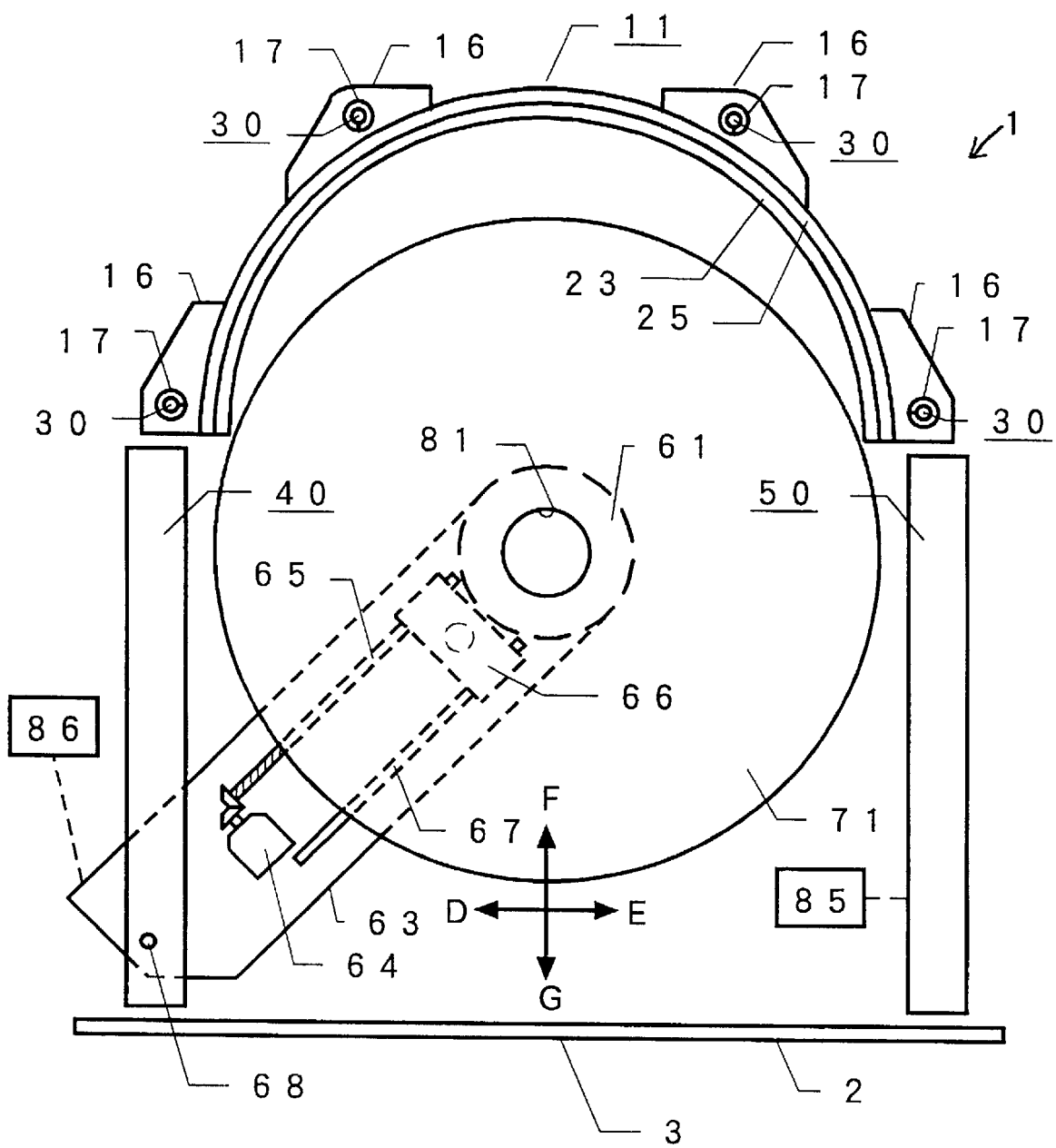
FIG. 6 is a schematic plan drawing for the purpose of describing the operations of the disk playback device over time.
Figure 11:
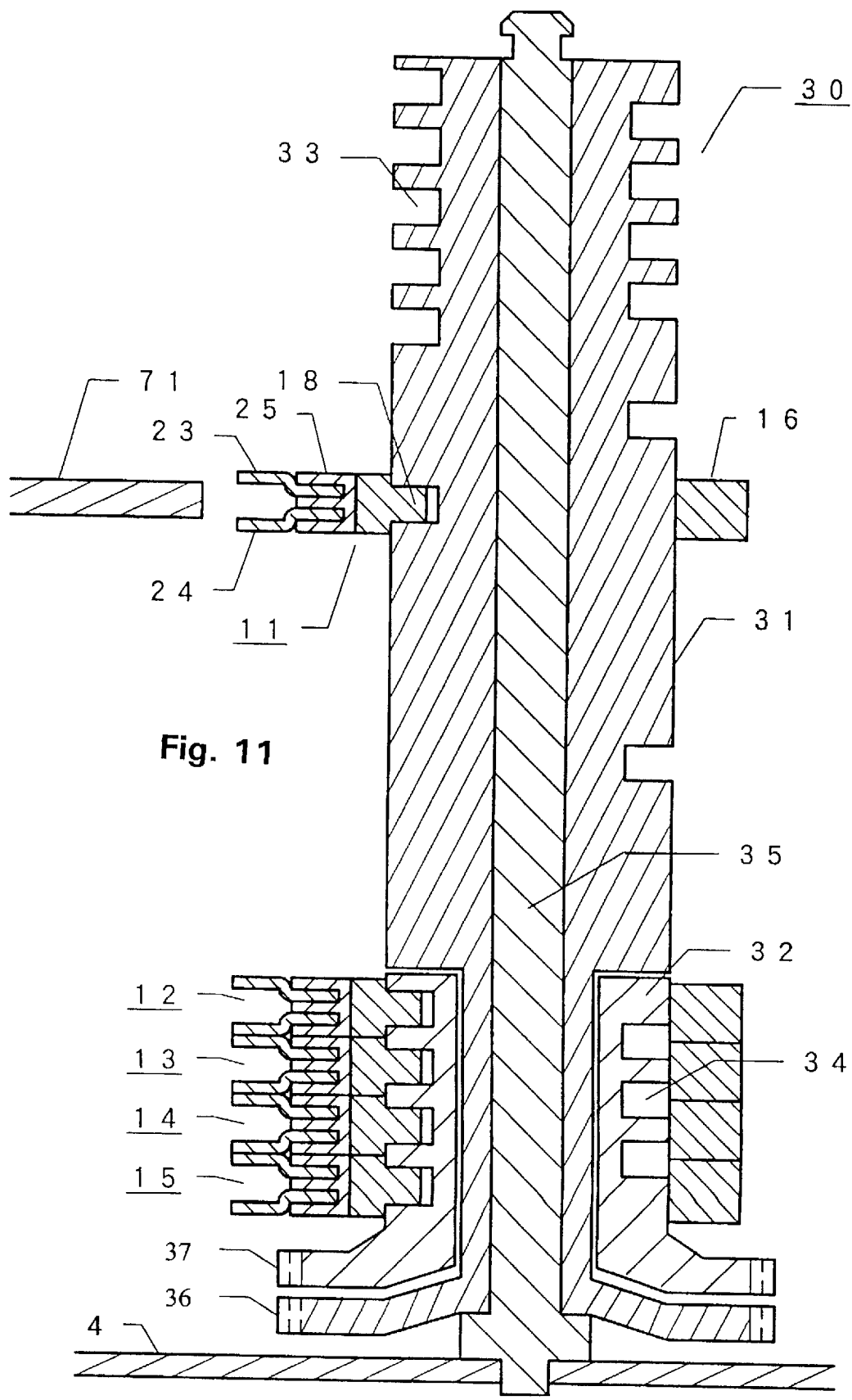
FIG. 11 is a cross-section drawing along the A—A line in FIG. 1 for the purpose of describing the operations of the cam means over time.
Figure 25:
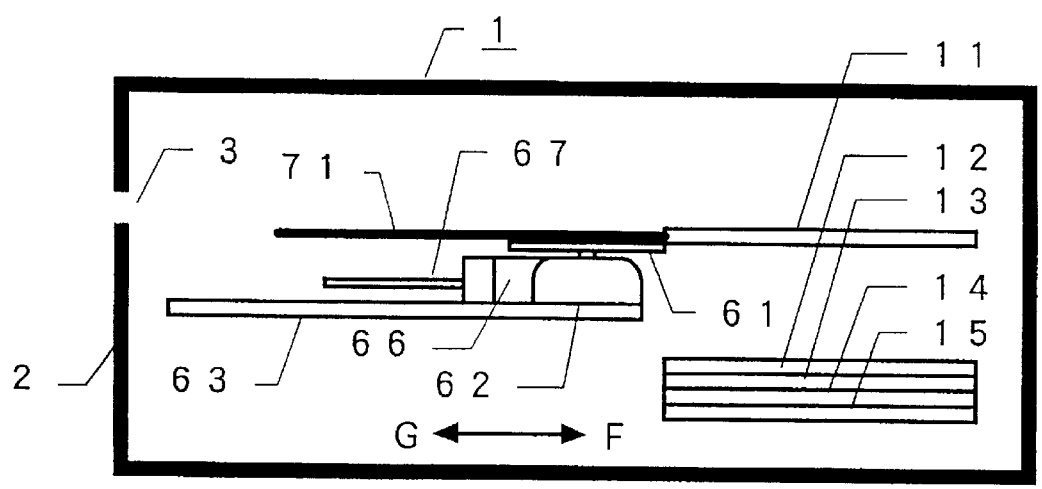
FIG. 25 is a schematic side-view drawing for the purpose of describing the operations of the disk playback device over time.

After disk 71 is chucked onto turntable 61, chassis drive mechanism 86 moves chassis 63 in the direction of arrow G in FIG. 5. This moves disk 71 out of disk holder 11 so that they are out of contact with each other. This state is shown in FIG. 6, FIG. 11, and FIG. 25. Thus, the motion of chassis 63 from FIG. 5 to FIG. 6 moves disk 71 out from disk holder 11. Turntable 61, chassis 63, and chassis drive mechanism 86 together serve as disk withdrawing means.

Figure 12:
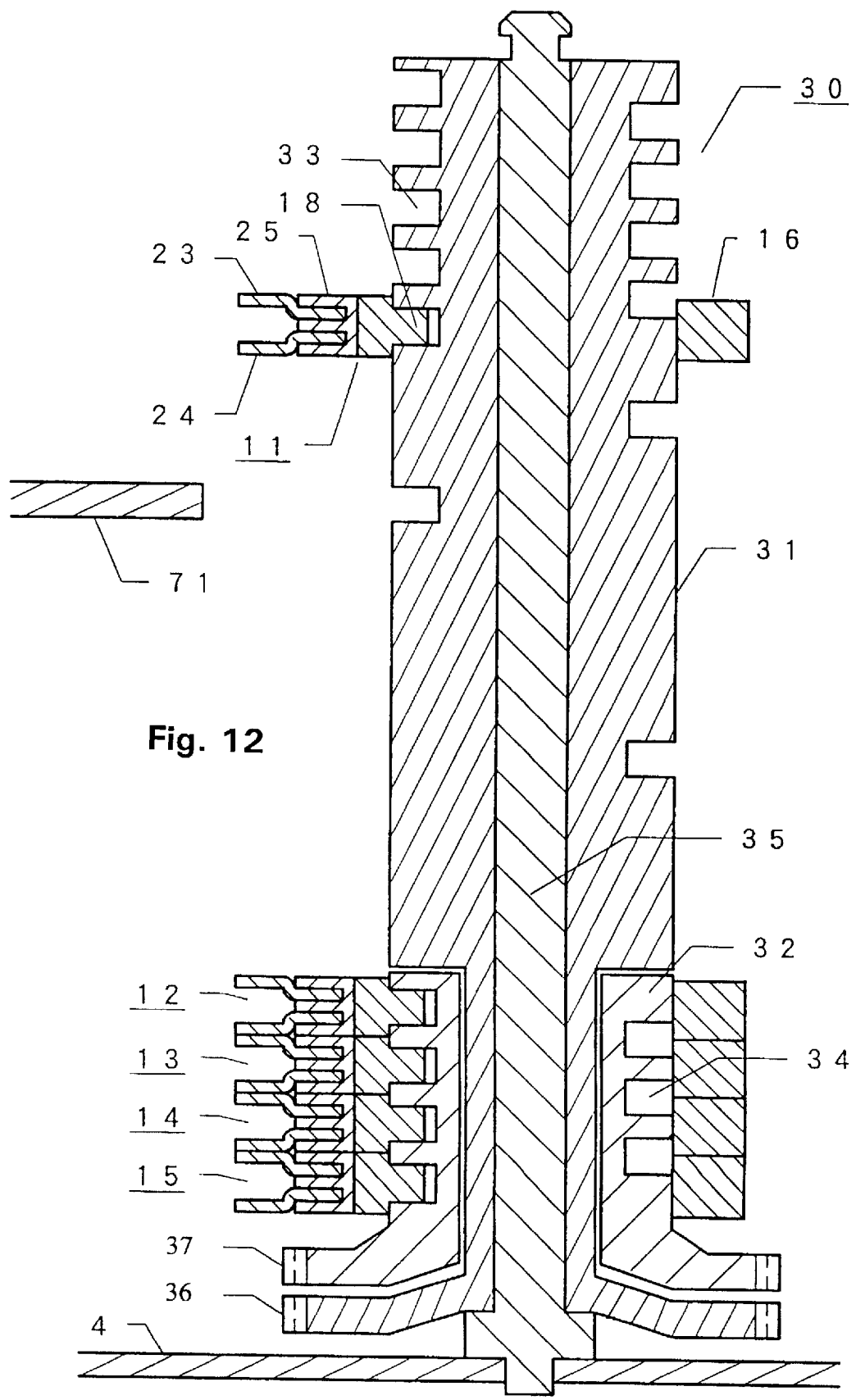
FIG. 12 is a cross-section drawing along the A—A line in FIG. 1 for the purpose of describing the operations of the cam means over time.
Figure 26:
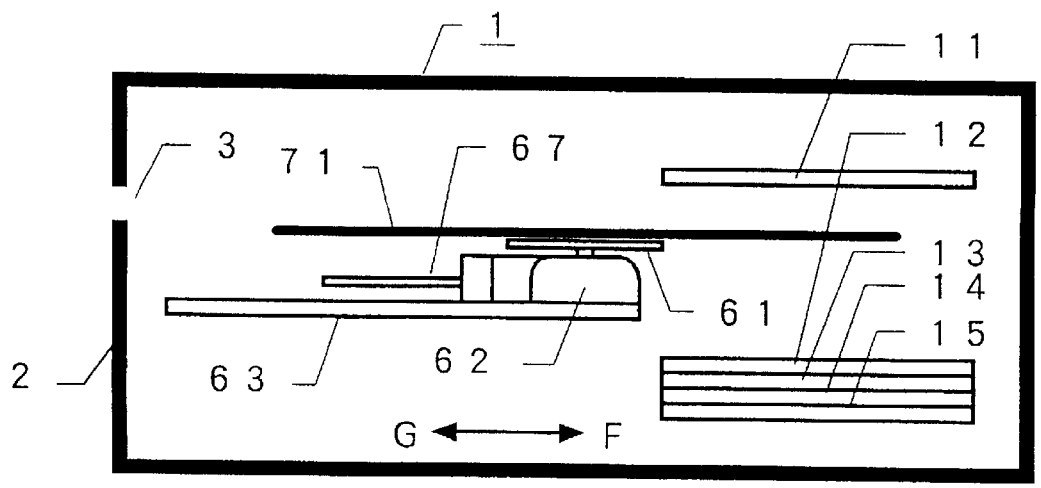
FIG. 26 is a schematic side-view drawing for the purpose of describing the operations of the disk playback device over time.

From this position with the disk withdrawn, cylindrical cam drive mechanism 82 rotates first cylindrical cam 31 by itself 360 degrees clockwise. Disk holder 11 is raised from position P7, shown in FIG. 7, for a distance two times the distance of pitch L2 to position P5. This state is shown in FIG. 12 and FIG. 26.

Figure 13:
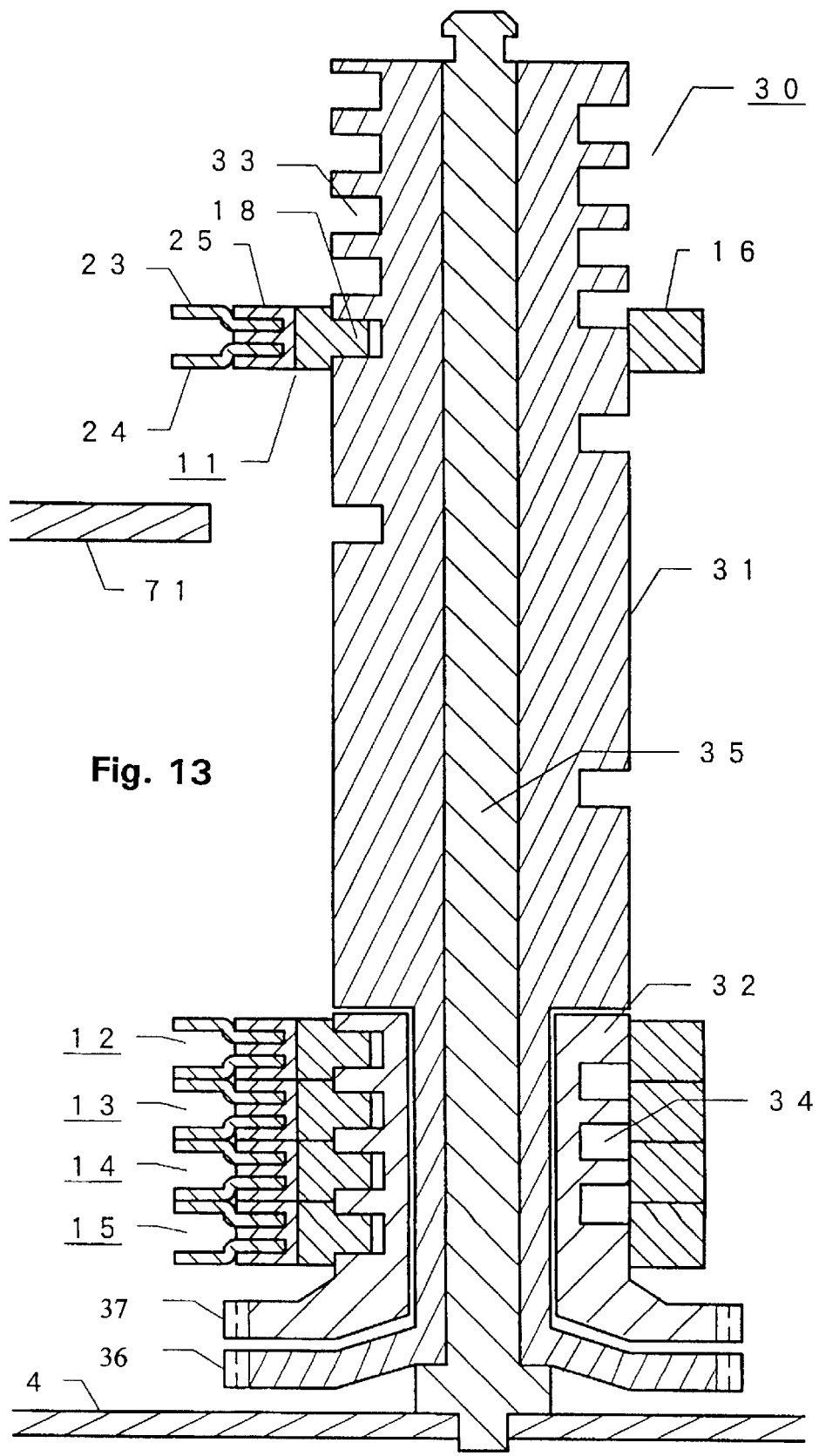
FIG. 13 is a cross-section drawing along the A—A line in FIG. 1 for the purpose of describing the operations of the cam means over time.
Figure 27:
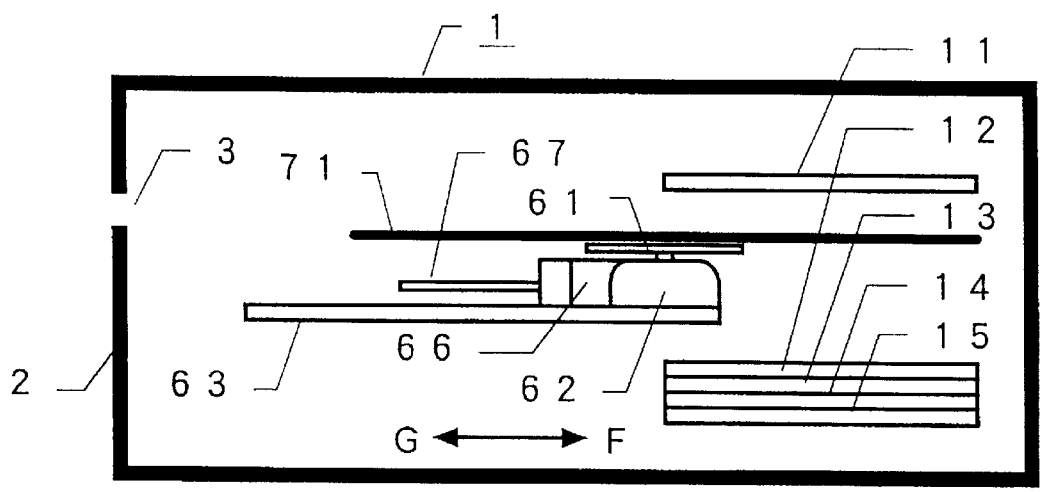
FIG. 27 is a schematic side-view drawing for the purpose of describing the operations of the disk playback device over time.

Referring to FIG. 6, chassis drive mechanism 86 moves chassis 63 in the direction of arrow F. Seen from above, disk 71 is moved to the same position as shown in FIG. 5. Referring to FIG. 13 and FIG. 27, however, disk holder 11 is moved vertically above the disk surface by a distance twice that of pitch L2. Thus, if the surface of disk 71 is shaken or if chassis 63 is suspended, disk 71 is prevented from coming into contact with other members while it rotates, even if chassis 63 is shaken vertically by an external vibration or the like.

Figure 2:
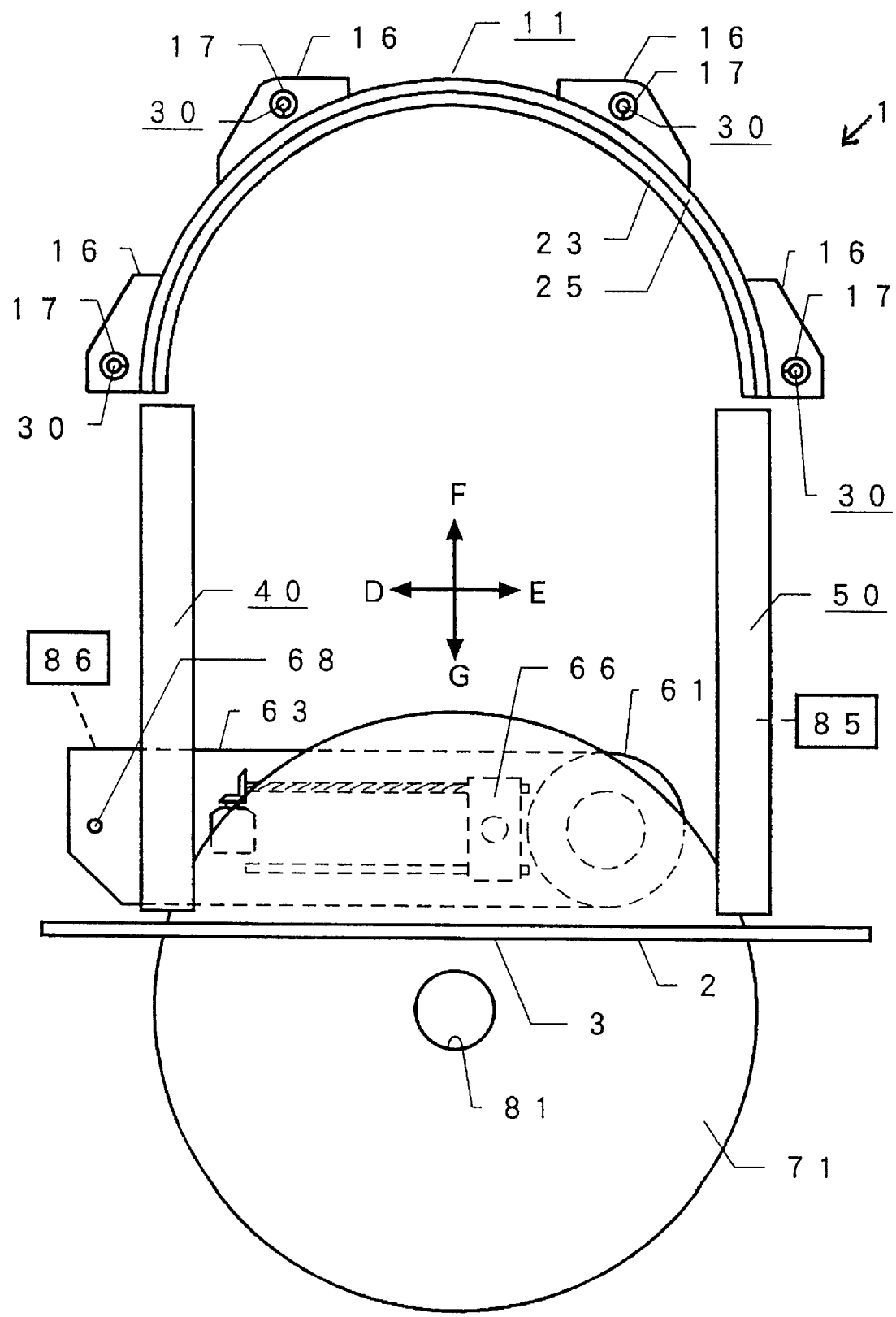
FIG. 2 is a schematic plan view to which reference will be made in describing the operations of the disk playback device over time.

Referring to FIG. 1–FIG. 3, when chassis 63 is at the recessed position, turntable 61 is positioned between front panel 2 and the disks supported by disk holders 11–15. As described above, disk 71 of disk holder 11 is pulled out to a withdrawn position for playback. Thus, disk holders 11–15 must remain separated from front panel 2, with a prescribed distance between the disk holders and front panel 2.

However, in this embodiment, chassis 63 is disposed in this space made necessary for other reasons. Turntable 61, when it is at the recessed position, is disposed in the flat region formed by the transfer of disk 71 from FIG. 2 to FIG. 3 at a position where it does not overlap with the disks in disk holder 11–15. Thus, there is no need for a separate space for the recessed position of turntable 61. This allows smaller lateral (the D-E direction in FIG. 1) and depth (the F-G direction in FIG. 1) dimensions for device 1.

The following is a description of the procedure for storing another disk 72 in disk holder 12 after the playback of disk 71 described above has been completed. Referring to FIG. 5, FIG. 13, and FIG. 27, after playback of disk 71 is completed, chassis drive mechanism 86 moves chassis 63 in the direction of arrow G in FIG. 5.

Referring to FIG. 6, FIG. 12, and FIG. 26, disk 71 is moved to the withdrawn position. Then, disk holder 11 is lowered from position P5 to position P7 shown in FIG. 11 and FIG. 27. This is achieved by cylindrical cam drive mechanism 82 rotating cylindrical cam 31 360 degrees counter-clockwise while cylindrical cam 32 remains stationary. The rotation of cylindrical cam 31 aligns the height of disk holder 11 with disk 71.

Figure 23:
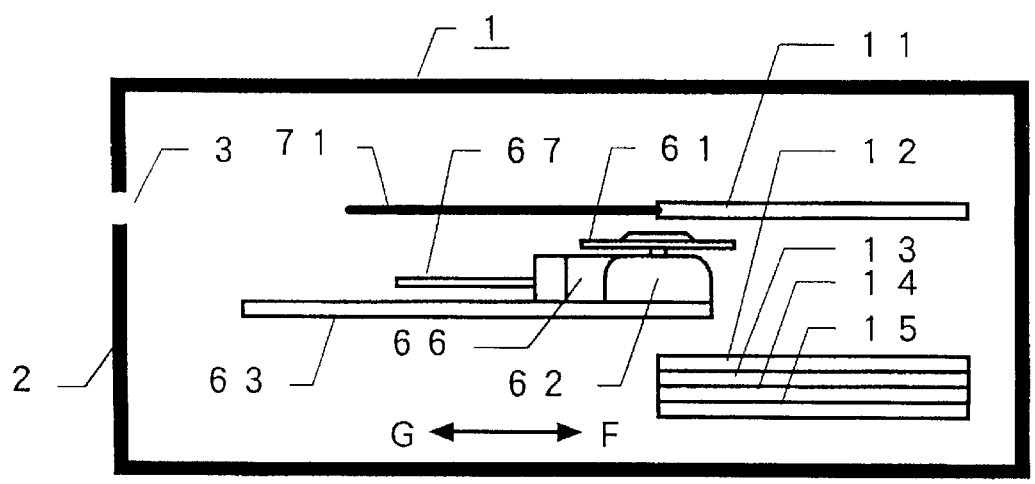
FIG. 23 is a schematic side-view drawing for the purpose of describing the operations of the disk playback device over time.

Chassis drive mechanism 86 then moves chassis 63 in the direction of arrow F. Referring to FIG. 5, FIG. 10, and FIG. 24, the edge of disk 71 are inserted in disk holder 11. Then, cylindrical cam 31 is rotated 180 degrees clockwise, moving disk holder 11 from position P7 shown in FIG. 7 to position P6. Referring to FIG. 9 and FIG. 23, disk 71 is raised up and the chucking between disk 71 and turntable 61 is released. Chassis drive mechanism 86 moves chassis 63 from the playback position shown in FIG. 5 to the position shown in FIG. 4 to a recessed position shown in FIG. 3 where it does not obstruct the vertical motion of the disk.

Then, cylindrical cam drive mechanism 82 rotates cylindrical cam 31 180 degrees counter-clockwise. Referring to FIG. 10, disk holder 11 is first brought back to position P7. Then, cylindrical cam drive mechanisms 82, 83 rotates both cylindrical cam 31 and 32 360 degrees clockwise. This causes disk holder 11 to move from position P7 to position P5, disk holder 12 from position P8 to position P7, disk holder 13 from position P9 to position P8, disk holder 14 from position P10 to position P9, and disk holder 15 from position P11 to position P10 (see FIG. 7).

Figure 14:
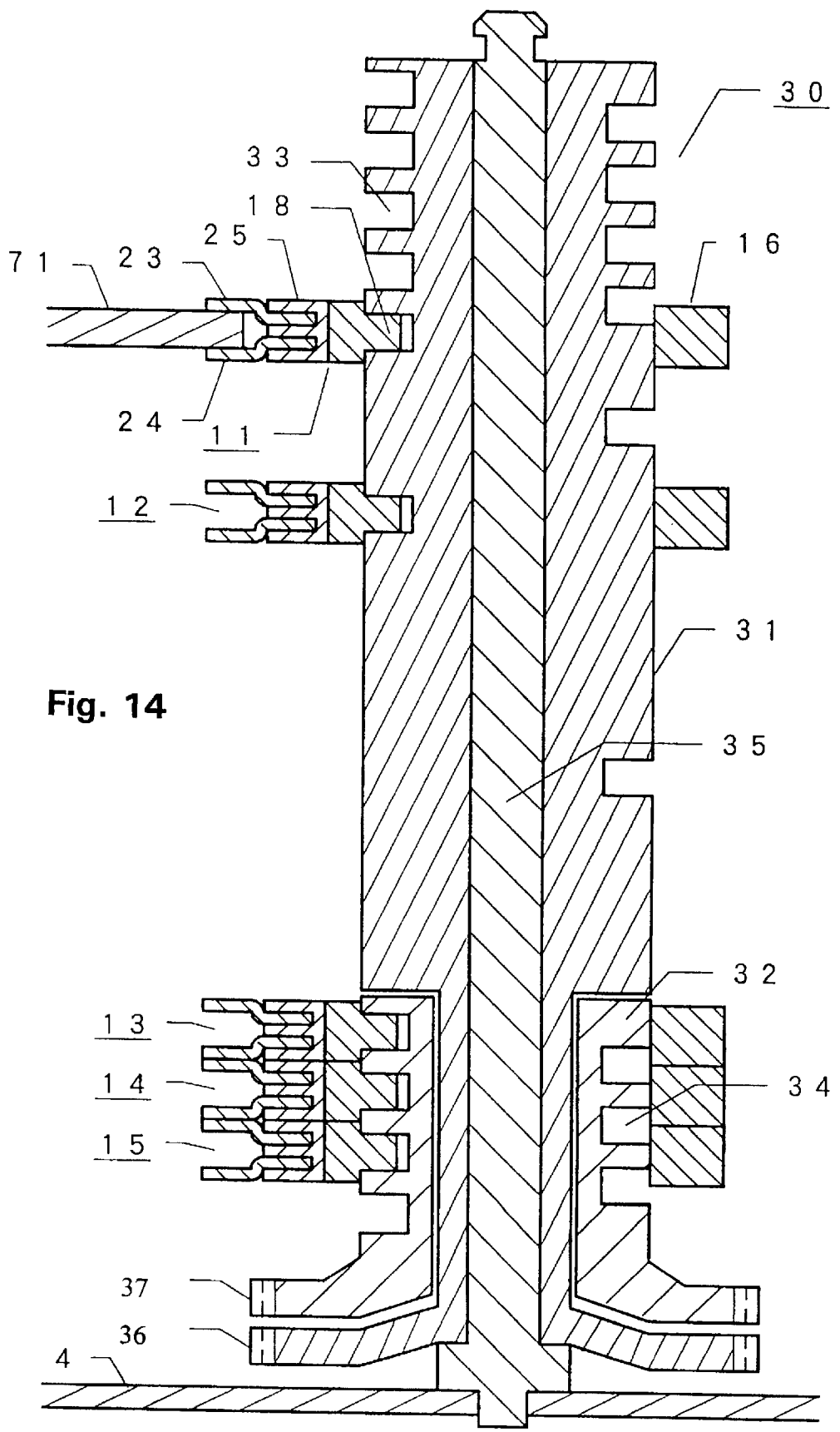
FIG. 14 is a cross-section drawing along the A—A line in FIG. 1 for the purpose of describing the operations of the cam means over time.
Figure 15:
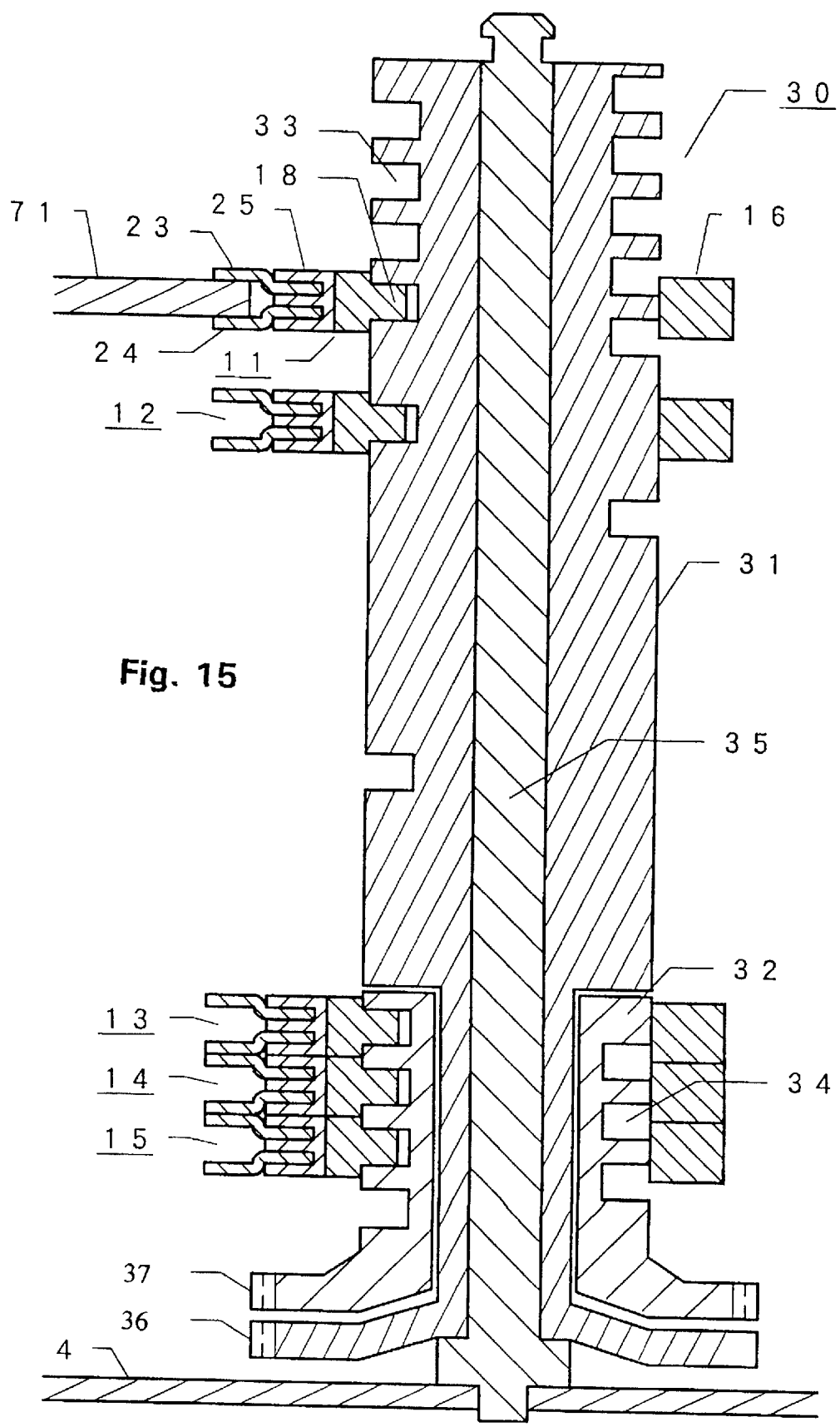
FIG. 15 is a cross-section drawing along the A—A line in FIG. 1 for the purpose of describing the operations of the cam means over time.
Figure 28:
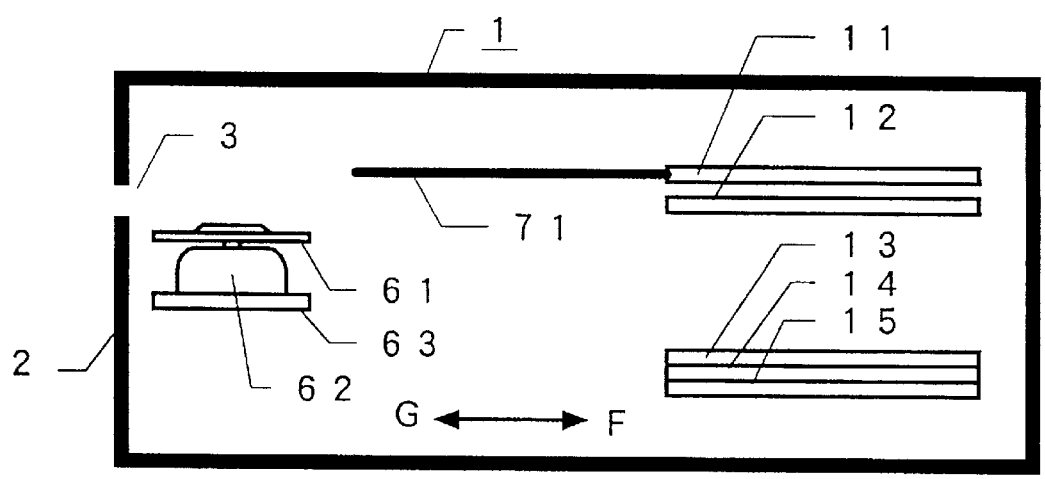
FIG. 28 is a schematic side-view drawing for the purpose of describing the operations of the disk playback device over time.

Referring to FIG. 14, cylindrical cam drive mechanism 82 is used to rotate cylindrical cam 31 180 degrees clockwise without rotating cylindrical cam 32. This causes disk holder 12 to move from position P7 to position P6 (see FIG. 7). The height of disk holder 12 is aligned with slit 3 in front panel 2. This state is shown in FIG. 15 and FIG. 28.

Figure 16:
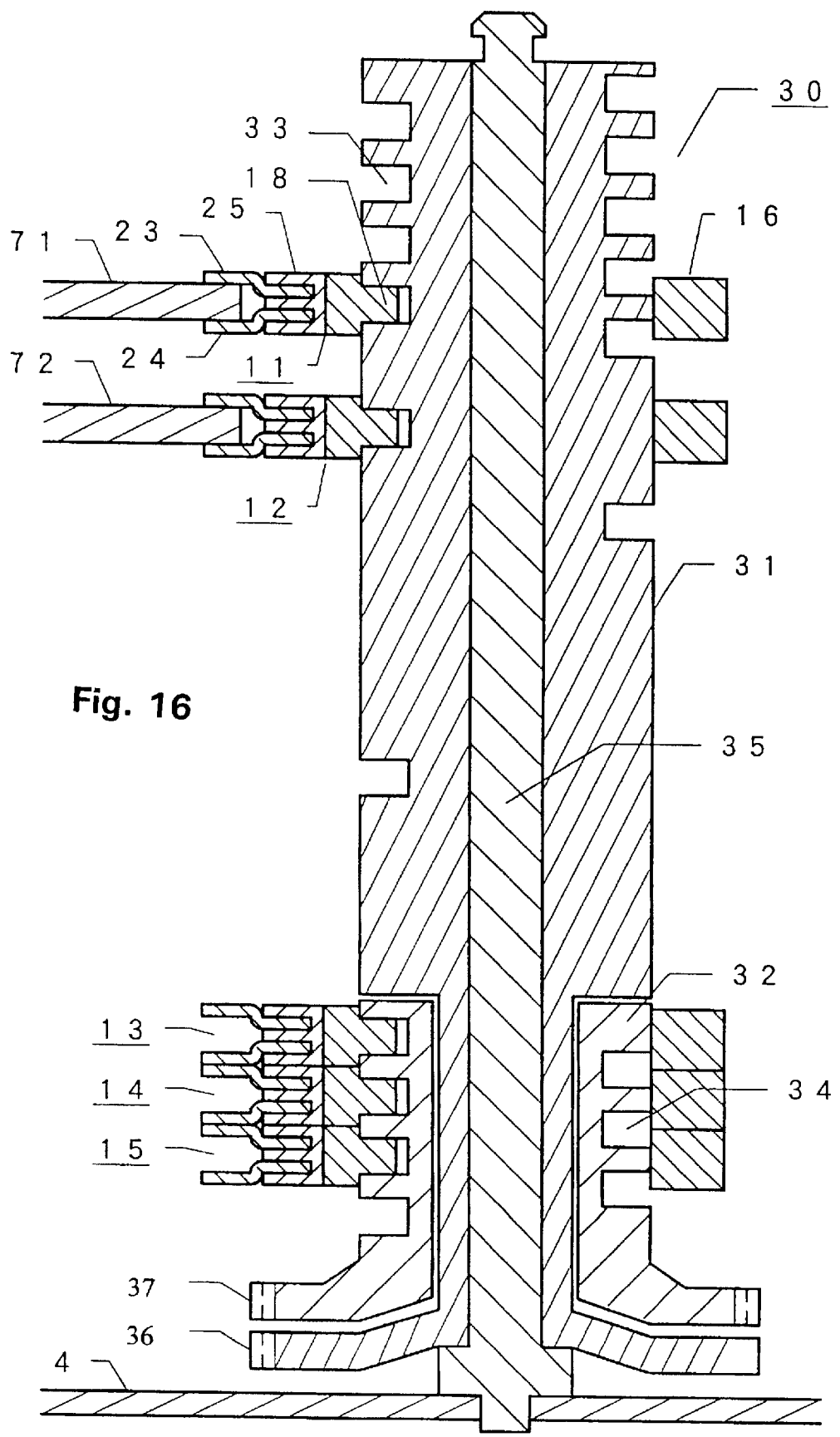
FIG. 16 is a cross-section drawing along the A—A line in FIG. 1 for the purpose of describing the operations of the cam means over time.
Figure 29:
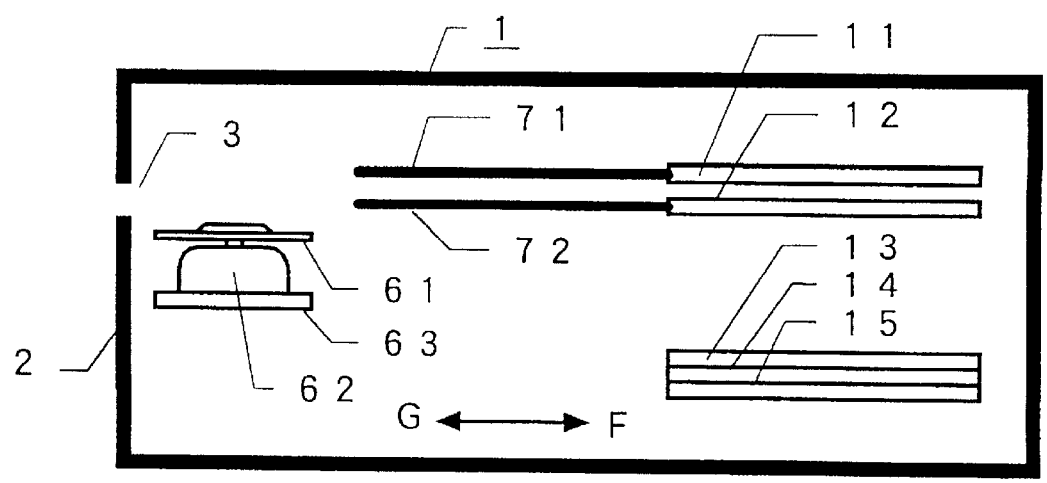
FIG. 29 is a schematic side-view drawing for the purpose of describing the operations of the disk playback device over time.
Figure 30:
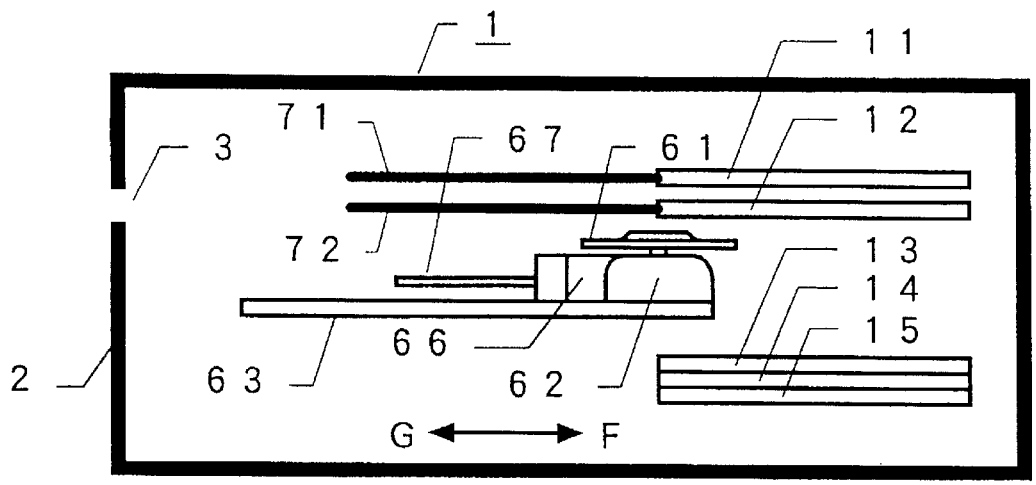
FIG. 30 is a schematic side-view drawing for the purpose of describing the operations of the disk playback device over time.

Referring again to FIG. 1, drive belt 45 of belt drive mechanism 40 and guide wall 53 of guide mechanism 50 are moved to a separation distance smaller than the diameter of the disk. Referring to FIG. 16 and FIG. 29, disk 72 is then loaded through slit 2 and moved inward until disk 72 is supported in disk holder 12 in the same manner as described above.

Figure 17:
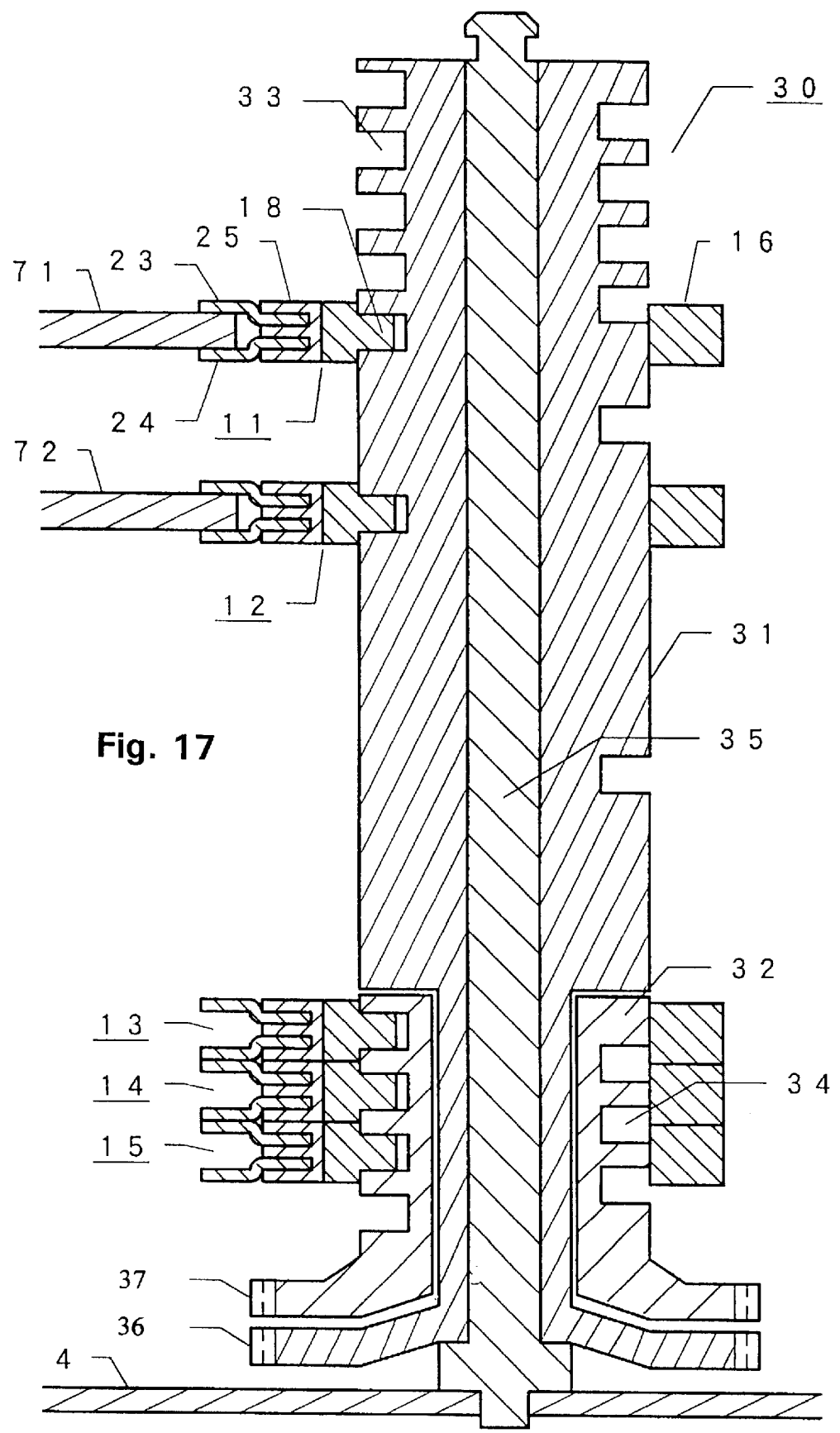
FIG. 17 is a cross-section drawing along the A—A line in FIG. 1 for the purpose of describing the operations of the cam means over time.
Figure 18:
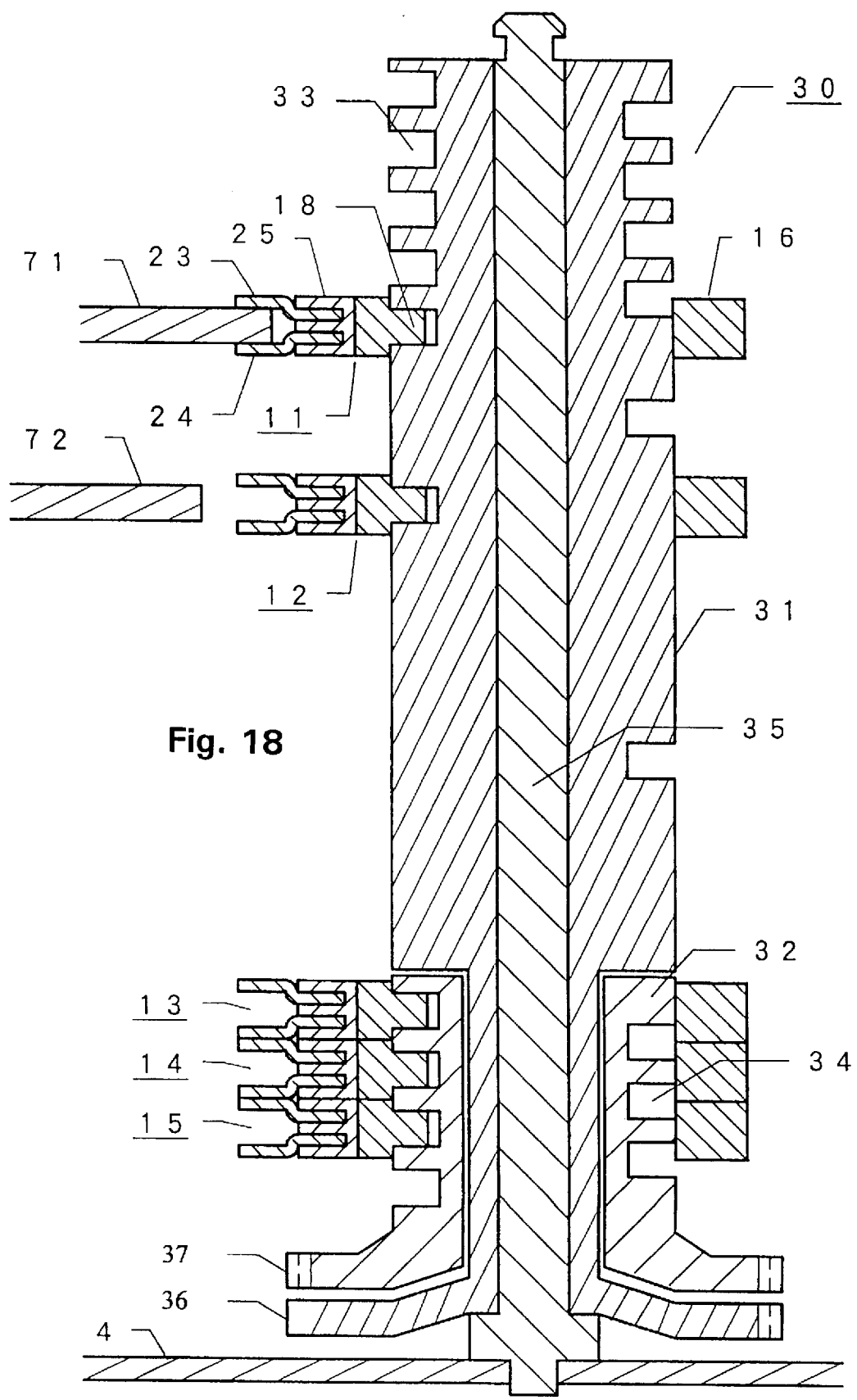
FIG. 18 is a cross-section drawing along the A—A line in FIG. 1 for the purpose of describing the operations of the cam means over time.
Figure 19:
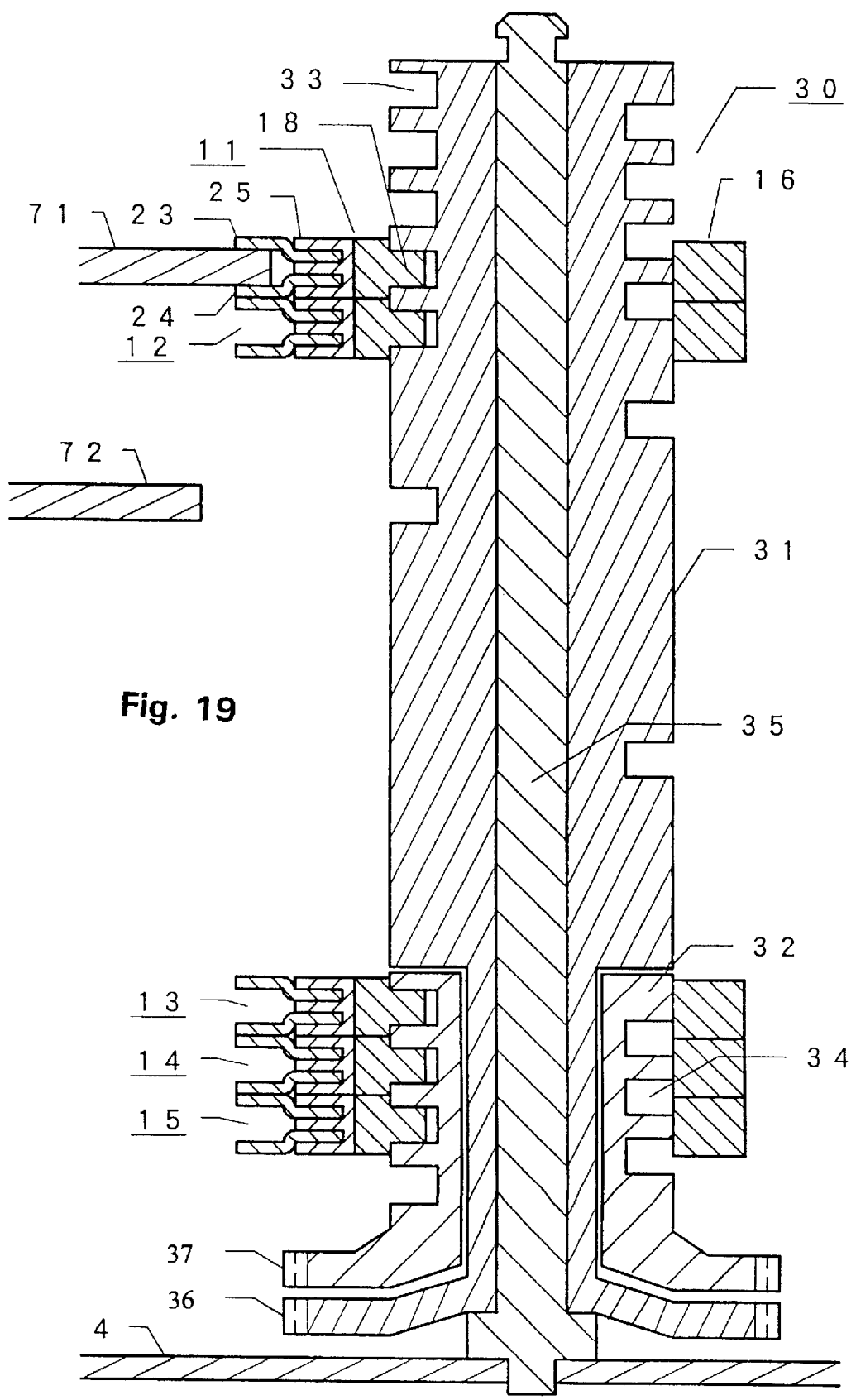
FIG. 19 is a cross-section drawing along the A—A line in FIG. 1 for the purpose of describing the operations of the cam means over time.
Figure 20:
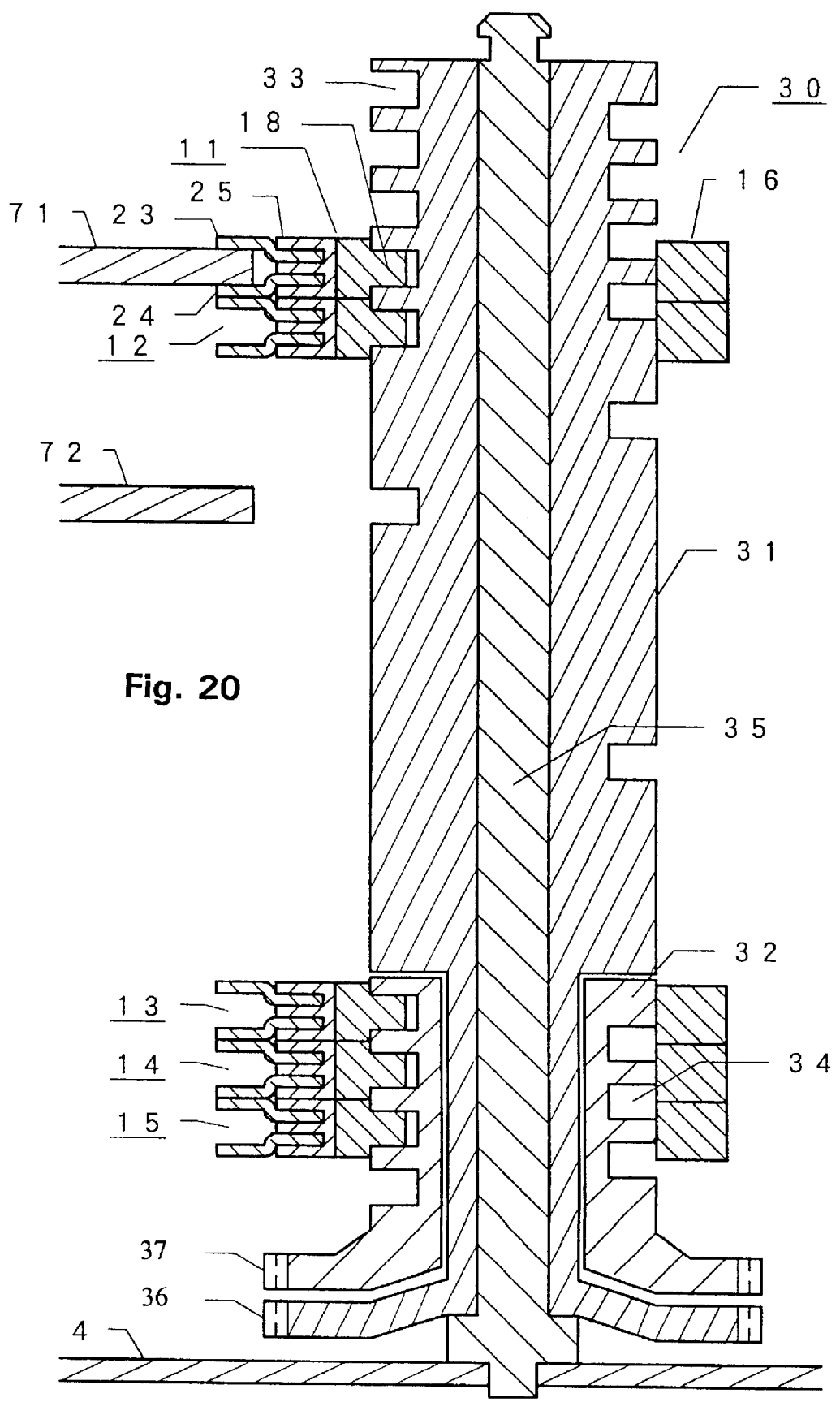
FIG. 20 is a cross-section drawing along the A—A line in FIG. 1 for the purpose of describing the operations of the cam means over time.
Figure 31:
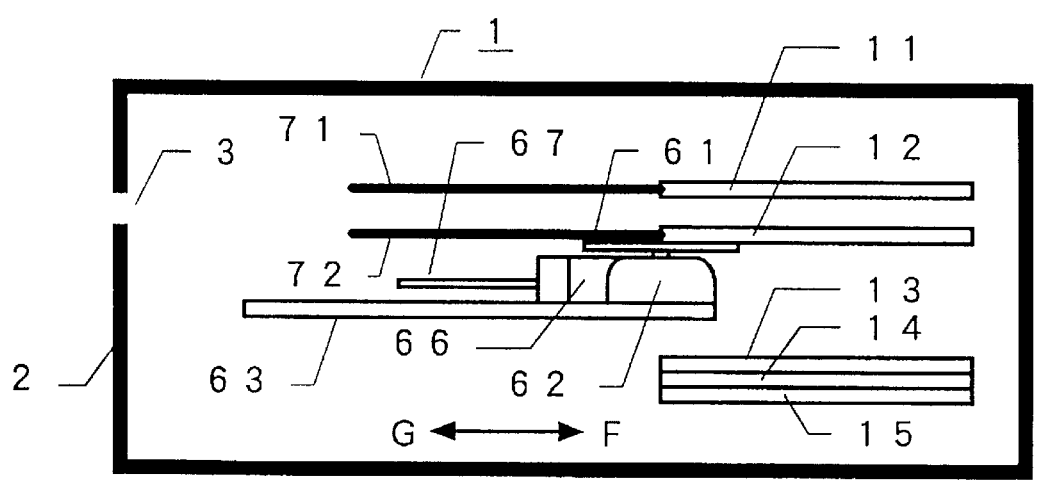
FIG. 31 is a schematic side-view drawing for the purpose of describing the operations of the disk playback device over time.
Figure 32:
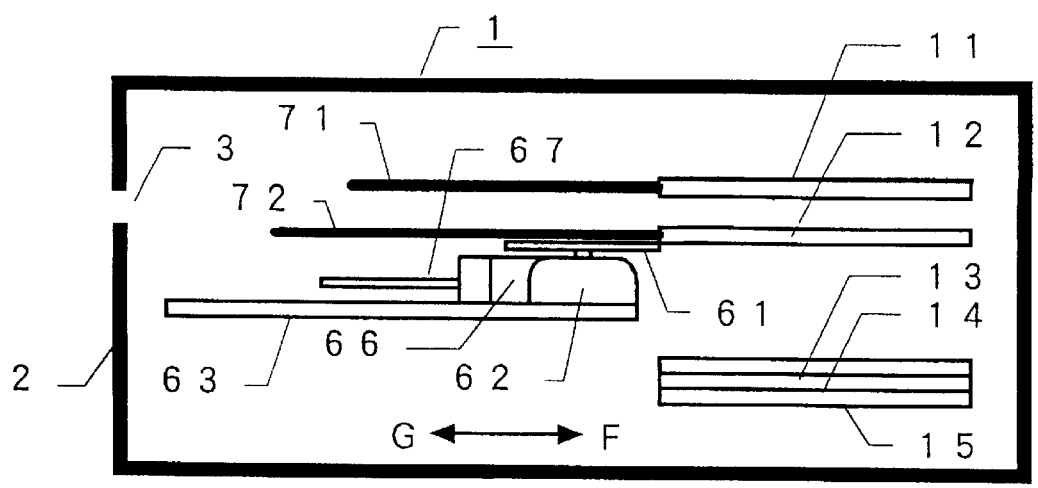
FIG. 32 is a schematic side-view drawing for the purpose of describing the operations of the disk playback device over time.
Figure 33:
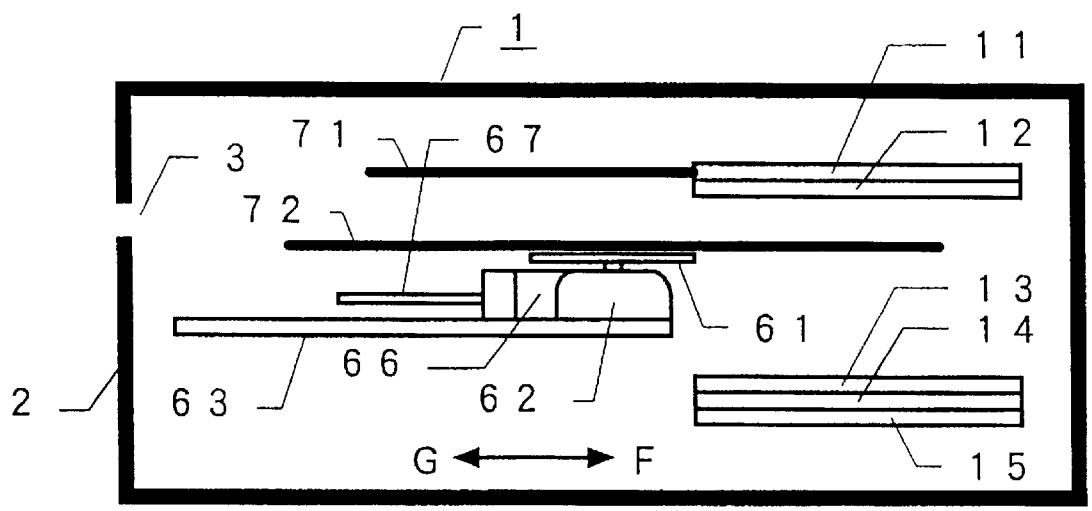
FIG. 33 is a schematic side-view drawing for the purpose of describing the operations of the disk playback device over time.
Figure 34:
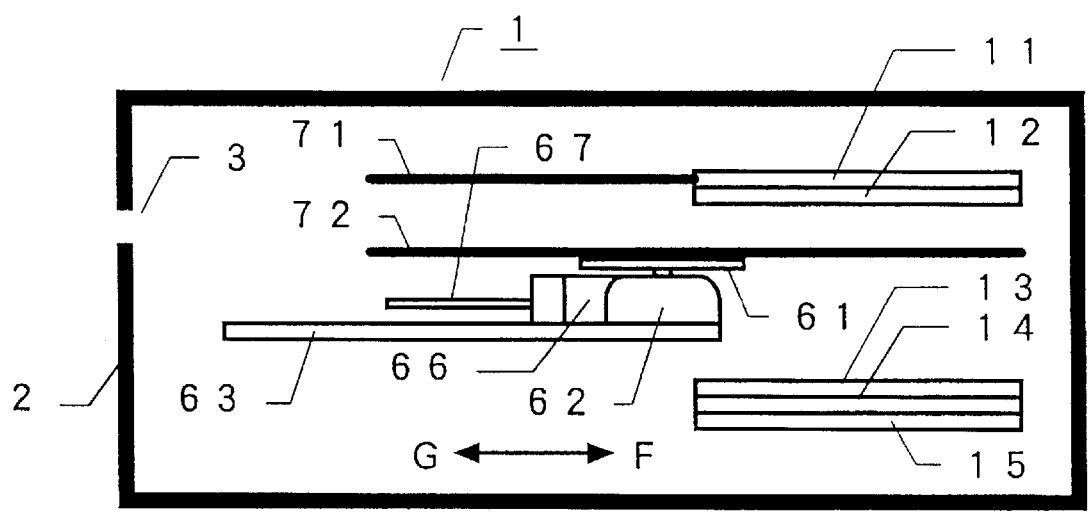
FIG. 34 is a schematic side-view drawing for the purpose of describing the operations of the disk playback device over time.

Then, when disk 72 is to be played back, chassis 63 is moved (FIG. 30), and first cylindrical cam 31 is rotated 180 degrees counter-clockwise without rotating second cylindrical cam 32. This causes disk 72 to be chucked to turntable 61 (FIG. 17, FIG. 31). Then, chassis 63 is moved so that disk 72 is withdrawn from disk holder 12 (FIG. 18, FIG. 32). First cylindrical cam 31 is rotated 360 degrees clockwise without rotating second cylindrical cam 32 so that disk holder 12 is moved to position P5 in FIG. 7 and disk holder 11 is moved to position P4 (FIG. 19, FIG. 33). Then, chassis 63 is moved, resulting in the playback state (FIG. 20, FIG. 34).

As described above, first cylindrical cam 31 can be rotated without rotating second cylindrical cam 32. It is also possible to rotate both by the same angle. When a disk is being played back, the disk holder corresponding to the disk to be played is positioned at position P5 (see FIG. 7). In order return the disk after playback to the disk holder, the disk holder is moved to a position P7, where its height is aligned with the playback position. During this operation, cylindrical cam 32 is not rotated. Similarly, in order to play back a loaded disk, the disk holder is moved from position P6, where its height is aligned with that of the loading surface, to position P7, which is aligned with the chucking position. In this case, only first cylindrical cam 31 is rotated counter-clockwise.

The following is a description of the sequence that takes place when disks are in all the disk holders, playback of disk 71 mounted in disk holder 11 has completed, and the disk mounted in fourth disk holder 14, the fourth disk holder from the top, is to be played back. In this case, cylindrical cams 31 and 32 are both rotated clockwise. Disk holder 11 is moved to position P3, disk holder 12 to position P4, disk holder 13 to position P5, disk holder 14 to position P7, and disk holder 15 to position P8 (see FIG. 7). Then, cylindrical cam 31 moves disk holder 14 from position P7 to position P6, and then to position P7 and then to position By separating cylindrical cam 31 and 32, the disk holder containing the disk to be played back can be moved to position P7, where it is aligned with the playback position. Then, the disk holder can be moved to position P5 without the need to move another disk holder below this disk holder or the disk contained in the lower disk holder. Thus, the disk to be played back can be given adequate clearance below it.

In the playback means transferring mechanism of the embodiment described above, turntable 61, optical pickup 66, and the like are disposed on chassis 63, which is rotated 45 degrees counter-clockwise and then moved. This causes turntable 61 to move from the recessed position where it does not overlap the disk to the disk playback position. However, the present invention is not restricted to this, and the playback means transferring mechanism can use different methods to move the playback means.

Furthermore, in the embodiment described above, the playback position of the disk is coplanar with the holding position of the disk. However, the present invention is not restricted to this. The playback position can also be the position shown in FIG. 6, FIG. 11, and FIG. 25 where the disk is withdrawn from the disk holder.

In the embodiment described above, the disk holder transfer mechanism includes cylindrical cams 31, 32, which engage disk holders 11–15. However, the present invention is not restricted to this, and other mechanisms that can perform similar operations can be used.

In the embodiment described above, disk transferring means includes drive belt 45, which engages with the edge of the disk. However, the present invention is not restricted to this. For example, a pair of rollers that support the recorded surface and the label surface of the disk can also be used.

In the embodiment described above, the disk support member includes a disk holder that supports the edge of the disk over a range of approximately 180 degrees. However, other structures can be used, such as a plate on which the disk is mounted. In this case, if the disk is mounted on the plate so that the recorded surface of the disk faces the plate, the plate and the plate below it are lowered after the chucking operation. A first and a second disk support member transfer mechanism must be structured so that during this lowering operation, the plate above the mounted plate does not come near the plate on which the disk is chucked.

During disk playback, the disk and the disk support member are moved away from each other by the chassis drive mechanism to move the disk, which is chucked to the turntable. However, it would of course also be possible to use the transferring means that transfers the disk into the device to move the disk to the withdrawn position.

As described above, according to the present invention, a playback means is disposed so that a recessed position, where the turntable does not overlap with the disks held inside a plurality of disk supporting members, is positioned inside a space for withdrawing a disk, which is provided to move the disk away from the disk supporting member. Thus, there is no need to provide a separate space for the recessed position of the playback means.

As described above, playback includes moving disks between stored positions in disk holders and the playback position. A single-play mode is also possible. Referring to FIG. 34, in single-play mode, even if all disk holders are full, or if storage of a disk to be played is not desired, disk 72 may be moved from slit 3 directly to the play position, where it is chucked and played. At the conclusion of play, disk 72 is moved directly outward through slit 3 without residence time in a disk holder.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A changer-type disk playback device comprising:
   a plurality of disk support members for supporting a plurality of disks;
   said disk supporting members are generally parallel to a plane;
   disk support member transferring means;
   each said disk supporting member includes a support engagement means for engaging with said disk support member transferring means;
   said disk support member transferring means translates at least one of said plurality of disk supporting members in a direction by moving at least one of said corresponding support engagement means at an angle to said plane;
   disk transferring means for transferring a disk between a selected disk supporting member and a disk insertion/removal position;
   playback means for performing playback of said disk;
   disk withdrawing means for moving at least one of said disk and said disk supporting member in a parallel direction to said plane to place said disk and said disk supporting member out of contact with each other such that said disk is out of contact with said disk supporting member at least when said disk is in a playback position; and
   playback means transferring mechanism for moving said playback means between a recessed position and said playback position, said recessed position being a position in a region formed by the transfer of said disk by said disk transferring means where a turntable of said playback means does not overlap with said disks held in said plurality of disk support members, and said playback position being a position where an axis of rotation of said turntable is within a perimeter of said disks held in said plurality of said disk support members.

2. Apparatus according to claim 1, wherein said playback means includes at least a turntable and an optical pickup.

3. Apparatus according to claim 1, wherein said angle is generally perpendicular to said plane.

4. A disk playback device comprising:
   a plurality of disk supporting members;
   said disk supporting members are generally parallel to a plane;
   a transfer means;
   each said disk supporting member includes a support engagement means for engaging with said transfer means;
   said transfer means moves a selected one of said disk supporting members to a selected position by moving said support engagement means of said selected one of said disk supporting members at an angle to said plane;
   a playback means;
   said playback means includes a turntable;
   a playback means transfer means for transferring said playback means between first, second and third positions in a parallel direction to said plane;
   said first position being a storage position;
   said second position being a disk chucking position;
   said third position being a disk playing position;
   an axis of said turntable in said third position being within a perimeter of disks in said plurality of disk supporting members;
   said transfer means being further effective for moving others of said plurality of disk supporting members to separated positions separated from said selected position;
   said separated positions being sufficiently far apart to permit said playback device to pass from said first position to said second position;
   said transfer means being further effective for moving said selected disk supporting member to engage said playback means when said playback means is in said second position such that said playback means may chuck said selected disk while said selected disk remains supported in said selected disk supporting member;
   said playback means being driven to withdraw said selected disk a predetermined distance from said disk supporting member to said third position for playback of said selected disk; and
   an axis of said playback means in said third position being within a perimeter of disks in said others of said plurality of disk supporting members.

5. Apparatus according to claim 4, wherein said first position includes said axis being outside a perimeter of disks in said others of said plurality of disk supporting members.

6. Apparatus according to claim 4, wherein said playback means in said first position is aligned vertically with said separated positions.

7. A disk playback device comprising:
   a plurality of disk supporting members;
   said disk supporting members are generally parallel to a plane;
   a turntable and optical pickup;
   a playback device transfer means for transferring said turntable and optical pickup between first and second positions in a direction parallel to said plane;
   said first position being a storage position;
   said second position being a disk playing position;
   an axis of said turntable in said second position being within a perimeter of disks in said plurality of disk supporting members;
   a transfer means;
   each said disk supporting member includes a support engagement means for engaging with said transfer means;
   said transfer means translates said plurality of disk supporting members to separated positions by moving respective said engagement means at an angle to said plane;

said separated positions are separated from said disk playing position;

disk transfer means for moving said disk, in a direction parallel to said plane, from outside said playback device to a position within said playback device wherein said turntable is able to chuck said disk;

said separated positions being sufficiently far apart to permit said turntable and said optical pickup to pass from said first position to said second position to play said disk; and said disk transfer means moving said disk upon conclusion of playing said disk to a position at least partly outside said disk playback device, without said disk being resident in any disk storage device.

8. A disk playback device comprising:

a first disk holder;

a second disk holder;

said first disk holder and said second disk holder are generally parallel to a plane;

said first disk holder and said second disk holder are concentric with one another;

a disk transfer means;

said disk transfer means moves a disk between an insertion/removal position and one of said first disk holder and said second disk holder while maintaining said disk parallel to said plane;

a disk holder transfer means;

a first engagement means for engaging said first disk holder with said disk holder transfer means;

a second engagement means for engaging said second disk holder with said disk holder transfer means;

a first and second portion of said disk holder transfer means;

said first portion includes means for translating said first disk holder in a direction while maintaining said first disk holder parallel to said plane;

said means for translating includes means for guiding said first engagement means at an angle with respect to said plane;

said second portion selectively engages said second engagement means;

said first portion includes a first cylindrical cam having a first outer diameter;

said second portion includes a second cylindrical cam having a second outer diameter; and said first and second outer diameters are the same.

9. A disk playback device as in claim 8, further comprising:

a selected disk;

a selected disk holder corresponding to said selected disk;

a playback means for performing playback of said selected disk;

a disk withdrawing means;

said disk withdrawing means moves said selected disk and said selected disk holder out of contact with one another by moving at least one of said selected disk and said selected disk holder in a parallel direction to said plane;

a recessed position;

a playback position;

said playback position being in a region where said selected disk is out of contact with said selected disk holder;

said recessed position being in a region where said playback means does not overlap with disks held in said disk support members; and a playback means transfer mechanism moves said playback means between said recessed position and said playback position.

10. A disk playback device as in claim 9 wherein said playback means includes at least a turntable and an optical pickup.

11. A disk playback device as in claim 10, wherein said angle is generally perpendicular to said plane.

12. A disk playback device as in claim 9 wherein:

said disk playback means includes a turntable and an optical pickup; and said disk withdrawing means cooperates with said turntable to move said selected disk out of contact with said selected disk holder.

13. A disk playback device as in claim 12, wherein said angle is generally perpendicular to said plane.

14. A disk playback device as in claim 12, wherein:

said first and second cylindrical cams rotate independently about a vertical axis;

said first and second cylindrical cams each include a cam groove;

said first and second cylindrical cams having at least one rotational position where said cam grooves are aligned with one another; and said disk holders include means for engaging said cam grooves.

15. A disk playback device as in claim 9, wherein said angle is generally perpendicular to said plane.

16. A disk playback device as in claim 9, wherein:

said first and second cylindrical cams rotate independently about a vertical axis;

said first and second cylindrical cams each include a cam groove;

said first and second cylindrical cams having at least one rotational position where said cam grooves are aligned with one another; and said disk holders include means for engaging said cam grooves.

17. A disk playback device as in claim 8, wherein said angle is generally perpendicular to said plane.

18. A disk playback device as in claim 8, wherein:

said first and second cylindrical cams rotate independently about a vertical axis;

said first and second cylindrical cams each include a cam groove;

said first and second cylindrical cams having at least one rotational position where said cam grooves are aligned with one another; and said disk holders include means for engaging said cam grooves.

19. A disk playback device as in claim 18, further comprising:

a first storage position along said first cylindrical cam groove;

a loading position along said first cylindrical cam groove;

a chucking position along said first cylindrical cam groove;

a second storage position along said second cylindrical cam groove;

said second region ranges from said first storage position to said chucking position;

said third region ranges from said chucking position to said second storage position;

said disk holder transferring means moves said selected disk holder between said first storage position and said disk loading position by guiding said means for engaging of said selected disk holder along said second region of said first cylindrical cam groove;

said disk holder transferring means moves said selected disk holder between said disk loading position and said disk chucking position by guiding said means for engaging of said selected disk holder along said first second region of said cylindrical cam groove; and said disk holder transferring means moves said selected disk holder between said disk chucking position and said second storage position by guiding said means for engaging of said selected disk holder through said third region of said first cylindrical cam groove into said second cylindrical cam groove.

20. A disk playback device, comprising:

a plurality of disk holders;

said disk holders are parallel to a plane;

disk transferring means for transferring a disk between a selected disk holder and a disk insertion/removal position;

disk holder transferring means having first and second cylindrical cams;

said first and second cylindrical cams are concentric about a vertical axis;

said first cam includes means for transferring a selected disk holder in a direction along said vertical axis while maintaining said selected disk holder parallel to said plane;

said first cylindrical cam includes a first cam groove;

said second cylindrical cam includes a second cam groove;

a first, second and third region along said first cylindrical cam groove;

a first pitch between adjacent grooves in said first region;

a second pitch between adjacent grooves in said second region, said second pitch being larger than said first pitch;

a third pitch between adjacent grooves in said third region, said third pitch being larger than said second pitch;

said first and second cylindrical cams having at least one rotational position where said first and second cam grooves are aligned with one another;

said disk holders include means for engaging one of said cam grooves; and said first and second cylindrical cams rotate independently about said vertical axis such that rotation of said first cam moves said selected disk holder in said direction by guiding said means for engaging of said selected disk holder along said first cylindrical cam groove.

21. A changer-type disk playback device comprising:

a plurality of disks;

each of said plurality of disks having a circumferential edge;

each of said plurality of disks having a surface;

a plurality of disk supporting members for supporting said plurality of disks;

each of said plurality of disk supporting members supports a circumferential edge of a supported disk;

disk support member transferring means;

each said disk supporting member includes a support engagement means for engaging with said disk support member transferring means;

said disk support member transferring means translates at least one disk supporting member in a direction by moving corresponding support engagement means at an angle with respect to surfaces of corresponding disks contained in said at least one supporting member;

disk transferring means for transferring a disk between a selected disk supporting member and a disk insertion/removal position;

playback means for performing playback of said disk;

disk withdrawing means for moving at least one of said disk and said disk supporting member in a parallel direction to said surface of said disk placing said disk and said disk supporting member out of contact with each other such that said disk is out of contact with said disk supporting member at least when said disk is in a playback position;

said disk supporting member is non-overlapping with said disk when said disk is in said playback position; and a playback means transferring mechanism for moving said playback means between a recessed position and said playback position, said recessed position being a position in a region formed by the transfer of said disk by said disk transferring means where said turntable does not overlap with said disks held in said plurality of disk support members, and said playback position being a position where said turntable overlaps with said disks held in said plurality of said disk support members.

22. Apparatus according to claim 21, wherein said playback means includes at least a turntable and an optical pickup.

23. Apparatus according to claim 21, wherein said angle is generally perpendicular to said surfaces of corresponding disks contained in said at least one supporting member.

24. A disk playback device comprising:

a plurality of disk supporting members;

a transfer means;

said disk supporting members are concentric with one another;

each said disk supporting member includes a support engagement means for engaging with said transfer means;

each said disk supporting member supports a circumferential edge of a supported disk;

a selected disk supported in one of said disk supporting members;

said transfer means moving said selected disk to a selected position by moving said support engagement means of said selected disk supporting members at an angle with respect to a surface of said selected disk;

a playback means;

a playback means transfer means for transferring said playback means between first, second and third positions in a parallel direction to said surface of said selected disk;

said first position being a storage position;

said second position being a disk chucking position;

said third position being a disk playing position;

said transfer means being further effective for moving others of said plurality of disk supporting members to separated positions separated from said selected position;

said separated positions being sufficiently far apart to permit said playback device to pass from said first position to said second position;

said transfer means being further effective for moving said selected disk supporting member to engage said playback means when said playback means is in said second position such that said playback means may chuck said selected disk while said selected disk remains supported in said selected disk supporting member;

said playback means being driven to withdraw said selected disk a predetermined distance from said disk supporting member to said third position for playback of said selected disk; and an axis of said playback means in said third position being within a perimeter of disks in said others of said plurality of disk supporting members.

25. Apparatus according to claim 24, wherein said first position includes said axis being outside a perimeter of disks in said others of said plurality of disk supporting members.

26. Apparatus according to claim 24, wherein said playback means in said first position is aligned vertically with said separated positions.

27. A disk playback device comprising:

a plurality of disk supporting members;

each said disk supporting member supports a circumferential edge of a supported disk;

a turntable and optical pickup;

a playback device transfer means for transferring said turntable and optical pickup between first and second positions in a direction parallel to a surface of a disk;

said first position being a storage position;

said second position being a disk playing position;

an axis of said turntable in said second position being within a perimeter of disks in said plurality of disk supporting members;

a transfer means;

each said disk supporting member includes a support engagement means for engaging with said transfer means;

said transfer means translates said plurality of disk supporting members to separated positions by moving respective said engagement means at an angle with respect to surface of disks contained in said respective disk supporting members;

said separated positions are separated from said disk playing position;

disk transfer means for moving said disk, in a direction parallel to said surface of said disk, from outside said playback device to a position within said playback device wherein said turntable is able to chuck said disk;

said separated positions being sufficiently far apart to permit said turntable and said optical pickup to pass from said first position to said second position to play said disk;

said disk supporting member is non-overlapping with said disk when said disk is in said playback position; and said disk transfer means moving said disk upon conclusion of playing said disk to a position at least partly outside said disk playback device, without said disk being resident in any disk storage device.

* * * * *